(12) United States Patent
Gedl et al.

(10) Patent No.: US 6,185,359 B1
(45) Date of Patent: Feb. 6, 2001

(54) SYSTEM FOR THE MULTI-SPEED REPRODUCTION OF RECORDED COLOR TELEVISION SIGNALS AND FOR THE CORRECTION OF COLOR SEQUENCE ERRORS IN REPRODUCED COLOR TELEVISION SIGNALS

(75) Inventors: Karl Gedl, St. Pölten-Spratzern; Günter Gschwantner, Krems an der Donau, both of (AT)

(73) Assignee: U.S. Philips Corporation, New York, NY (US)

( * ) Notice: Under 35 U.S.C. 154(b), the term of this patent shall be extended for 0 days.

(21) Appl. No.: 08/925,961

(22) Filed: Sep. 9, 1997

(30) Foreign Application Priority Data

Sep. 11, 1996 (EP) .................................................. 96890141

(51) Int. Cl.$^7$ ..................................................... H04N 9/88
(52) U.S. Cl. .................................. 386/2; 386/6; 386/21; 386/47
(58) Field of Search .................................. 386/1–2, 6–8, 386/13, 16, 21–22, 24, 44, 18, 26, 27, 47, 77–80; 360/64; 348/616, 617

(56) References Cited

U.S. PATENT DOCUMENTS

| 4,672,469 | * | 6/1987 | Namiki et al. | 386/18 |
| 4,800,447 | * | 1/1989 | Toba | 386/77 |
| 5,010,416 | * | 4/1991 | Yasumura et al. | 386/2 |
| 5,172,240 | * | 12/1992 | Nakazato | 386/2 |
| 5,218,447 | | 6/1993 | Hideo . | |

FOREIGN PATENT DOCUMENTS

| 3305961C2 | 9/1983 | (DE) . |
| 0563841A2 | 10/1993 | (EP) . |
| 2117995A | 10/1983 | (GB) . |

* cited by examiner

Primary Examiner—Wendy Garber
Assistant Examiner—Christopher Onuaku
(74) Attorney, Agent, or Firm—Edward W. Goodman

(57) ABSTRACT

In a system (1) including a reproducing device (2) for reproducing color television signals recorded on a record carrier (7) in adjacent track portions in at least one normal reproducing mode and at least one special reproducing mode, which includes a color-television-signal-processing unit, and having color television receiving device (3) which includes a color signal demodulator (87) for demodulating the color signal (C) of the reproduced color television signals with the aid of switching information (SI) and a switching information generating unit (96) for generating the switching information (SI), and a control information generating unit (4) which generates control information (TI) upon the occurrence of a discontinuity in the reproduced color television signals, the control information generating unit (4) of the system (1) and the switching information generating unit (96) of the color television receiving device (3) are interconnected so as to cooperate with one another, and the control information (TI) can be applied from the control information generating unit (4) to the switching information generating unit (96) and the switching information (SI) can be influenced by the control information (TI).

10 Claims, 6 Drawing Sheets

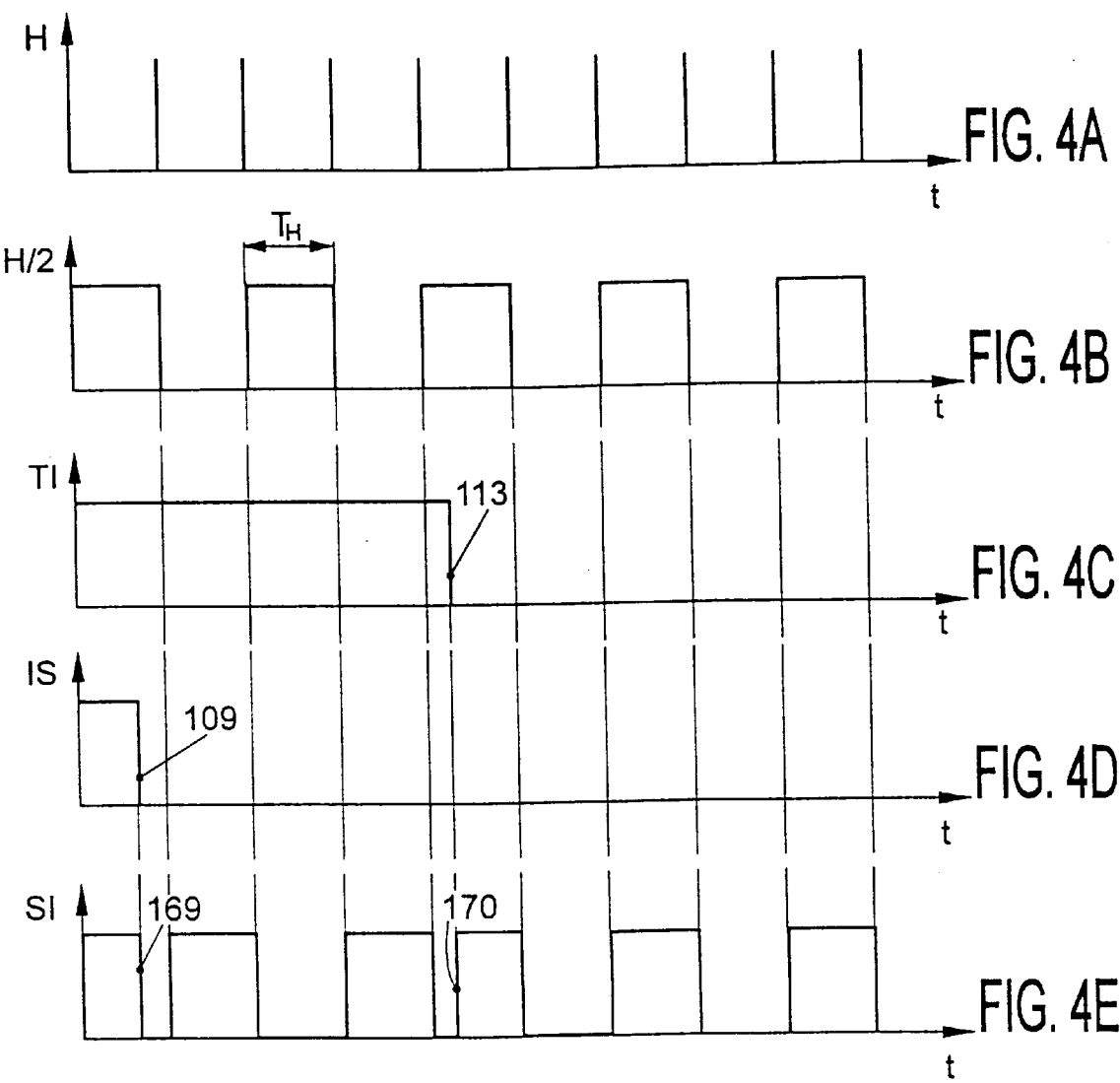
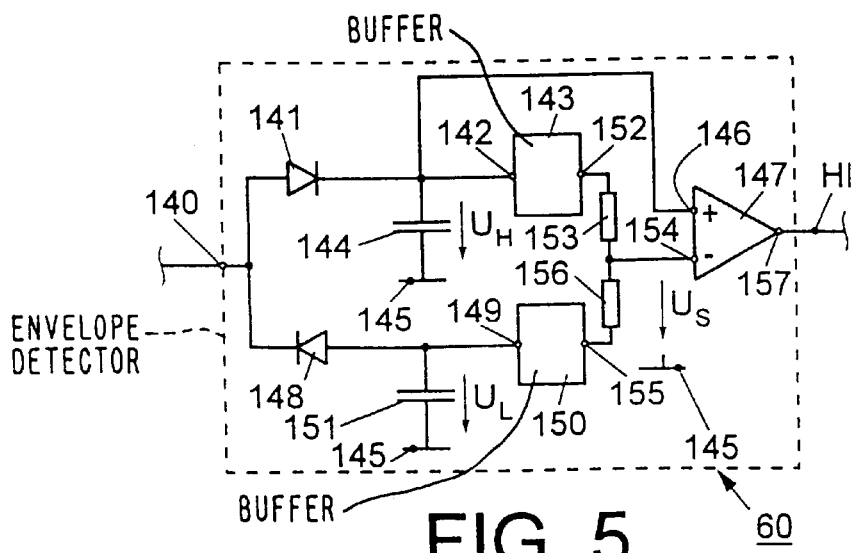

SYSTEM FOR THE MULTI-SPEED REPRODUCTION OF RECORDED COLOR TELEVISION SIGNALS AND FOR THE CORRECTION OF COLOR SEQUENCE ERRORS IN REPRODUCED COLOR TELEVISION SIGNALS

BACKGROUND OF THE INVENTION

1. Field of the Invention

The invention relates to a system comprising a reproducing device for reproducing color television signals recorded on a record carrier, this device comprises a deck unit for driving a record carrier which can be loaded into the reproducing device and for reproducing, by means of at least one reproducing head, color television signals recorded in adjacent track portions on the record carrier and which comprises an entry unit for activating at least one normal reproducing mode, in which the at least one reproducing head scans the record carrier along the adjacent track portions, and at least one special reproducing mode, in which the at least one reproducing head scans the record carrier traverses adjacent track portions, which comprises a color-television-signal-processing unit, which comprises a color signal demodulator for demodulating the color signal of the reproduced color television signals with the aid of switching information in order to preclude color sequence errors in a demodulated color signal, and a switching information generating unit for generating the switching information, and a control information generating unit by means of which control information can be generated upon the occurrence of a discontinuity in a reproduced color television signal, by means of which control information the correction of color sequence errors in a reproduced color signal can be initiated.

The invention further relates to an integrated circuit including a color signal demodulator for demodulating the color signal of color television signals, which have been reproduced from a record carrier and which can be applied to the integrated circuit, by means of switching information in order to preclude color sequence errors in a demodulated color signal, and further including a switching information generating unit for generating the switching information.

2. Description of the Related Art

Such a system of the type defined in the opening paragraph is known from, for example, German Patent DE 33 05 961 C2. The known system comprises a television receiver, forming the color television receiving device, and a video disc player, forming reproducing device, for color television signals recorded on a record carrier in the form of a video disc in accordance with the PAL color television system.

The color television receiving device of the known system includes a color-television-signal-processing unit in accordance with the PAL color television system, this unit comprising a burst-phase discriminator, a sync separator, and a flip-flop forming a switching information generating unit for generating switching information. The switching information can be applied to a color subcarrier switch of the color-television-signal-processing unit, this switch changing the switching state when switching information occurs, in order to apply a color subcarrier whose phase is in accordance with the PAL color television system to an R-Y demodulator of a color signal demodulator.

By means of the known reproducing device, it is possible to reproduce recorded color television signals in a normal reproducing mode and in at least one special reproducing mode. In a special reproducing mode, a reproducing head of the reproducing device, this head taking the form of an optical scanner, scans the record carrier in such a manner that the reproducing heads traverses adjacent track portions, which, in the present case, extend along a spiral path. When the reproducing head moves from one spiral track portion to an adjacent spiral track portion in a special reproducing mode, color sequence errors arise in the color signal, these errors forming a discontinuity in the reproduced color television signal.

The known system further comprises, as a control information generating unit, a special control unit which generates control information in the form of a jump signal upon the occurrence of a discontinuity in the reproduced color television signal during the passage from one track portion to an adjacent track portion in a special reproducing mode.

The reproducing device of the known system includes a color signal processing circuit comprising separate means with which color sequence errors in a color television signal reproduced by means of the reproducing device can be corrected. During the occurrence of a jump signal forming the control information, this separate means is controlled so as to correct the color sequence error producing a discontinuity. This separate means forms an additional element, which makes the reproducing device of the known system, and hence the entire known system, more expensive, which is a disadvantage.

SUMMARY OF THE INVENTION

It is an object of the invention to avoid the aforementioned problems in a system of the type defined in the opening paragraph and to provide a system of the type defined in the opening paragraph, in which color sequence errors occurring in a reproduced color television signal during the passage of a reproducing head from one track portion to an adjacent track portion in a special reproducing mode can be corrected substantially without additional separate means in the reproducing device.

According to the invention, to achieve this object, a system of the type defined in the opening paragraph is characterized in that the control information generating unit of the system is connected to cooperate with the switching information generating unit of the color television receiving device, and in that the control information from the control information generating unit can be processed in the switching information generating unit and the switching information, which can be generated by means of the switching information generating unit, can be influenced by the control information. In this way, it is achieved that control information generated by the control signal generating unit can be processed by means of the switching information generating unit in the color television receiving device, the control information enabling the switching information, which can be generated by means of the switching information generating unit, to be influenced in such a manner that during the demodulation of a reproduced color signal to be demodulated by means of the color signal demodulator, this demodulation being effected with the aid of the influenced switching information, color sequence errors in said color signal can be corrected in the color television receiving device, practically only with means which are present anyway in the color television receiving device, which has the advantage that separate means for the correction of color sequence errors in the reproducing device of a system in accordance with the invention can be dispensed with, which is cost-saving.

In a system in accordance with the invention, it has proved to be advantageous if the reproducing device is formed by a magnetic-tape video recorder device and the magnetic-tape video recorder device comprises two rotationally drivable magnetic heads as reproducing heads for reproducing color television signals from a magnetic tape which can be loaded into the magnetic-tape video recorder device as the record carrier and which is drivable in its longitudinal direction, color television signals being recorded on the magnetic tape in adjacent track portions which are inclined with respect to the longitudinal direction of the magnetic tape, each track portion carrying a given number of line signals of a color television signal and the line signals of adjacent track portions being recorded so as to be offset relative to one another in the longitudinal directions of the track portions, and if the control information generating unit is included in the magnetic-tape video recorder device and is connected to the switching information generating unit via an electrically conductive connection, and if the control information generating unit includes a phase-jump detector by means of which it is possible to detect a phase jump in a reproduced color television signal at the transition from one track portion to an adjacent track portion during reproduction in a special reproducing mode and by means of which the control information can be generated in dependence upon a detected phase jump. This results in a system having a particularly simple control information generating unit because this unit merely requires an easy-to-realize phase-jump detector.

In a system as described in the preceding paragraph, the phase jump detector can be adapted to detect a phase jump in the sequence of color subcarrier signals in the color signal of a reproduced color television signal. It has also proved to be advantageous if the phase-jump detector is adapted to detect a phase jump in the train of horizontal synchronization pulses in a reproduced color television signal. In practice, this has proved to be particularly advantageous for the reliable detection of a phase jump.

In a system in accordance with the invention, it has further proved to be advantageous if the reproducing device is formed by a magnetic-tape video recorder device and the magnetic-tape video recorder device comprises four rotationally drivable magnetic heads as reproducing heads for reproducing color television signals from a magnetic tape which can be loaded into the magnetic-tape video recorder device as the record carrier and which is drivable in its longitudinal direction, color television signals being recorded on the magnetic tape in adjacent track portions which are inclined with respect to the longitudinal direction of the magnetic tape, each track portion carrying a given number of line signals of a color television signal and the line signals of adjacent track portions being recorded so as to be offset relative to one another in the longitudinal directions of the track portions, and each time two of the four magnetic heads are arranged adjacent one another and form a head pair, and if the magnetic-tape video recorder device includes a head switching stage and a stage control unit for the head switching stage, which stage control unit can supply stage control information which can be applied to the head switching stage, in such a manner that in a special reproducing mode the reproduction can be switched from one magnetic head of a head pair to the other magnetic head of the same head pair at the transition from one track portion to an adjacent track portion, and if the control information generating unit is formed by the stage control unit for the head switching stage and the control information from the stage control unit can be applied as control information to the switching information generating unit. This has the advantage that a stage control unit for the head switching stage, which is present anyway in the reproducing device in such a system, is also utilized as control information generating unit.

In a system in accordance with the invention, it has further proved to be advantageous if there has been provided an envelope detector by means of which the amplitude of the envelope of a color television signal reproduced by means of ta least one magnetic head can be detected and by means of which detection information can be generated in dependence upon the detected amplitude of the envelope upon the occurrence of a discontinuity in a reproduced color television signal, which detection information can be applied to the stage control unit forming the control information generating unit and which influences the stage control information which can be supplied by the stage control unit. Thus, a system is obtained which has the advantage that a particularly reliable and correctly timed recognition of a discontinuity in a reproduced color television signal is guaranteed. Furthermore, it is favorable that a discontinuity is detected on the basis of the entire reproduced color television signal.

In a system in accordance with the invention, it has further proved to be advantageous if the switching information generating unit is adapted to generate switching information in the form of a rectangular switching signal of half the line frequency and to produce a 180° phase shift in the rectangular switching signal as additional switching information upon receipt of control information applied to it. Such a switching information generating unit has the advantage that it can be realized in a particularly simple and consequently cheap manner.

In a system in accordance with the invention, it has further proved to be advantageous if the color television signals which can be reproduced from a record carrier by means of the reproducing device are in accordance with the PAL color television system and the color signal demodulator is formed by a PAL color signal demodulator which includes a color subcarrier phase switch, and if the switching information generating unit has an output connected to a control input of the color subcarrier phase switch of the PAL color signal demodulator, and if the switching information from the switching information generating unit can be applied to the control input of the color subcarrier phase switch to change the switching state of the color subcarrier phase switch. Thus, it is achieved that the switching information influenced in the switching information generating unit when control information occurs is applied to the color subcarrier phase switch and causes the switching state of this phase switch to be changed, which has the advantage that the color subcarrier phase switch of the PAL color signal demodulator is, in addition, used for the correction of a color sequence error.

In a system in accordance with the invention, it has further proved to be advantageous if the color television signals which can be reproduced from a record carrier by means of the reproducing device are in accordance with the SECAM color television system and the color signal demodulator is formed by a SECAM color signal demodulator which includes two color signal delay switches, and if the switching information generating unit has an output connected to a control input of each of the color signal delay switches of the SECAM color signal demodulator, and if the switching information from the switching information generating unit can be applied to each control input of the two color signal delay switches to change the switching states of the color signal delay switches. Thus, it is achieved that the switching information influenced in the switching information generating unit when control information occurs is applied to the two color signal delay switches and causes their switching states to be changed, which has the advantage that both color signal delay switches of the SECAM color signal demodulator are, in addition, used for the correction of a color sequence error.

In a system in accordance with the invention, it has further proved to be advantageous if the color signal demodulator and the switching information generating unit have been incorporated in an integrated circuit, and if the integrated circuit has a control information terminal via which control information from the control information generating unit can be applied to the switching information generating unit. In this way, the color signal demodulator and the switching information generating unit can be realized in a particularly compact and cheap manner.

In a system in accordance with the invention, it has further proved to be advantageous if the reproducing device and the color television receiving device and the control information generating unit have been arranged in a common housing and form parts of a combination apparatus. Thus, a system in accordance with the invention advantageously takes the form of a combination apparatus in which the color sequence errors in a reproduced color television signal are corrected directly, i.e., in the color television receiving device incorporated in the combination apparatus, while in the case that an electrically conductive connection is needed between a control information generating unit and the switching information generating unit in the color television receiving device such a connection is particularly simple to realize in a combination apparatus.

According to the invention, an integrated circuit of the type defined in the second paragraph is characterized in that the integrated circuit has a control information terminal via which control information can be applied to the switching information generating unit, this control information being characteristic of a discontinuity in a reproduced color television signal and by means of which the correction of color sequence errors in a reproduced color signal can be initiated. This results in an integrated circuit by means of which the color signal of a reproduced color television signal, which color signal is applied to the integrated circuit, can be demodulated with the aid of control information applied to the integrated circuit and by means of which, in addition, a color sequence error in the color signal of a reproduced color television signal can be corrected.

The afore-mentioned as well as further aspects of the invention will be apparent from the exemplary embodiments described hereinafter and will be elucidated on the basis of these embodiments.

BRIEF DESCRIPTION OF THE DRAWINGS

The invention will be described in more detail hereinafter with reference to the drawings, which show five exemplary embodiments to which the invention is not limited, in which

FIGS. 4A to 4E are schematic waveform diagrams of signals appearing in the two systems shown in FIGS. 1 and 2 and in FIG. 3.

FIG. 5 shows an envelope detector in the form of a peak detector, used in a system in accordance with a third embodiment of the invention.

DESCRIPTION OF THE PREFERRED EMBODIMENTS

Figure 1:
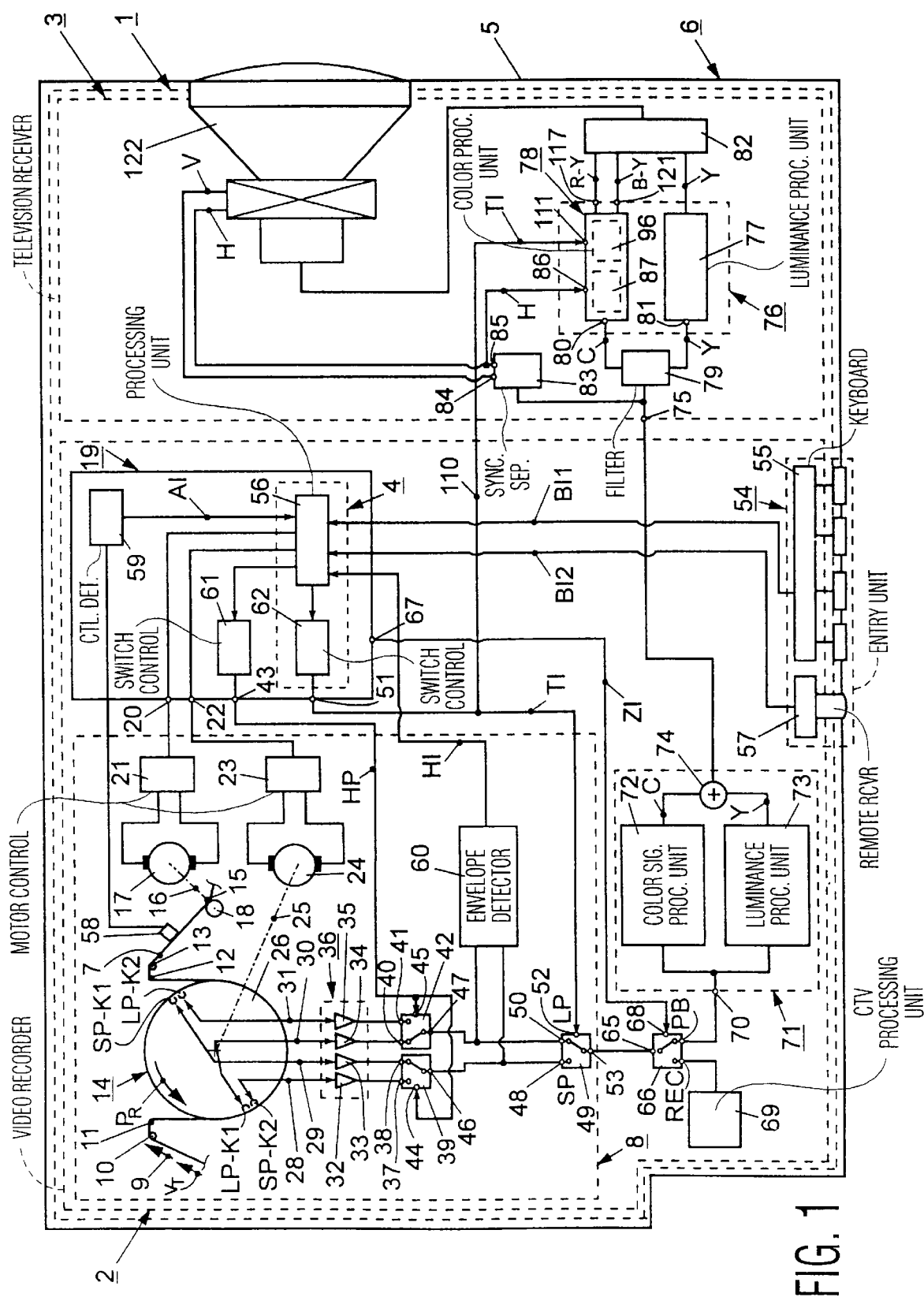
FIG. 1 shows a system in accordance with a first embodiment of the invention, comprising a reproducing device, formed by a magnetic-tape video recorder device having four magnetic heads, comprising a color television receiving device, and comprising a control information generating unit included in the magnetic-tape video recorder device and controlled by an envelope detector, this system being incorporated in a combination apparatus and being adapted to process color television signals in accordance with the PAL color television system.

FIG. 1 shows a system 1 in accordance with a first embodiment of the invention, comprising a magnetic-tape video recorder device 2, which forms a reproducing device, a color television receiving device 3, and a control information generating unit 4, in the present cases incorporated in the magnetic-tape video recorder device 2. The system 1 is accommodated in a housing 5 of a combination apparatus 6.

The magnetic-tape video recorder device 2 is adapted to reproduce color television signals recorded on a magnetic tape 7, the magnetic tape 7 forming a record carrier. The magnetic-tape video recorder device 2 comprises a deck unit 8 for driving the magnetic tape 7 which can be loaded into the magnetic-tape video recorder device 2. The magnetic tape 7 is guided in its longitudinal direction 9 by means of movable tape guides 10, 11 and 12, 13 and is wrapped around a drum-shaped scanning device 14. By means of a capstan 15, which can be driven by a tape drive motor 17 via a drive transmission 16, shown diagrammatically as a dash-dot line, and against which a movable tape pressure roller 18 can be pressed, the magnetic tape 7 can be driven in its longitudinal direction 9 with a tape speed $V_T$, i.e., either with a normal tape speed $(V_T)_1$ for making or reproducing a standard recording, or with a lower tape speed $(V_T)_2$, equal to half the normal tape speed $(V_T)_1$, for making or reproducing a long-play recording, or with at least one further tape speed $(V_T)_n$ for reproducing a standard recording or a long-play recording in a special reproducing mode, which is often referred to as multi-speed reproduction.

The system 1 comprises a microcomputer 19. The microcomputer 19 can supply first motor control signals from its first output 20 to a first motor control stage 21, which controls the speed of the tape drive motor 17. The microcomputer 19 can supply second motor control signals from its second output 22 to a second motor control stage 23, which controls the speed of a drum motor 24. The drum motor 24 is coupled to a rotationally drivable drum section 26 of the scanning device 14 via a drive transmission 25 in order to drive the drum section 26. Generally know means, which are not shown and not described herein, have been provided for controlling the speed of the tape drive motor 17 and of the drum motor 24.

The rotationally drivable drum section 26 carries four magnetic heads SP-K1, SP-K2, LP-K1 and LP-K2 as reproducing heads for reproducing color television signals from the magnetic tape 7, which heads can thus be driven to rotate in a direction indicated by an arrow $P_R$. The for magnetic heads SP-K1, SP-K2, LP-K1 and LP-K2 are arranged side by side in pairs and form a first head pair SP-K1, LP-K2 and a second head pair SP-K2, LP-K1. The magnetic heads SP-K1, LP-K1, which are disposed substantially opposite one another on the drum section 26, have a similar first azimuth angle AZI1, and the magnetic heads SP-K2, LP-K2, which are disposed substantially opposite one another on the drum section 26, have a similar second azimuth angle AZI2, which differs from the first azimuth angle AZI1. The magnetic heads SP-K1 and SP-K2 have a larger first gap width GAP1 and the magnetic heads LP-K1 and LP-K2 have a smaller second gap width GAP2.

Figure 9:
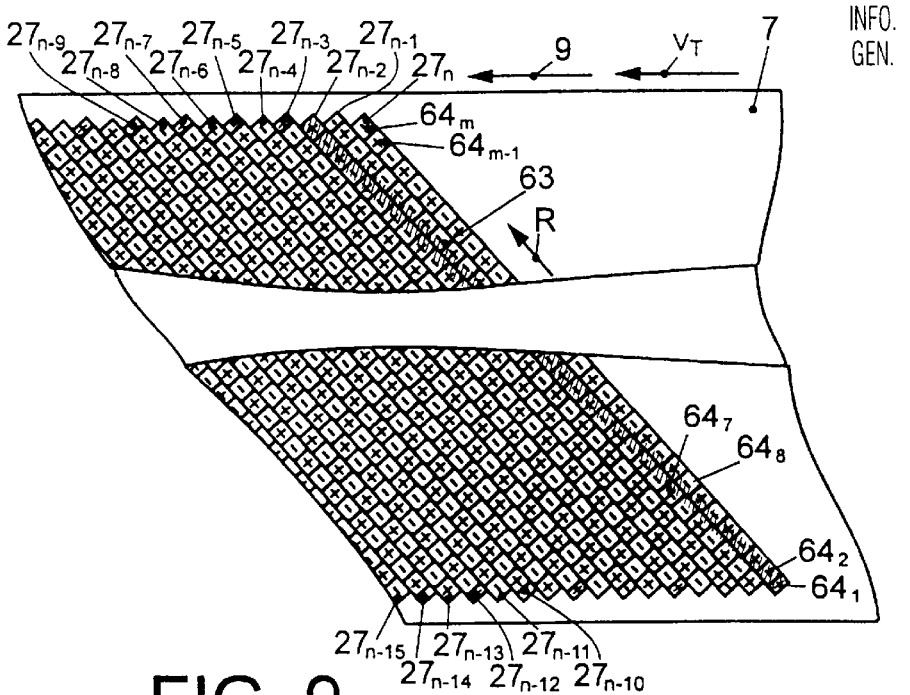
FIG. 9 shows a record carrier formed by a magnetic tape on which color television signals have been recorded in juxtaposed track portions which are inclined relative to the longitudinal direction of the magnetic tape, a given number of line signals of a color television signal being recorded in each track portion and the line signals of adjacent track portions being shifted relative to one another in the longitudinal directions of the track portions.

The magnetic heads SP-K1, SP-K2, LP-K1 and LP-K2 are adapted to reproduce color television signals recorded— as shown in FIG. 9—in juxtaposed track portions on the magnetic tape 7, which track portions are inclined with respect to the longitudinal direction 9 of the magnetic tape 7. Of the track portions 27 those referenced $27_n$ to $27_{n-15}$ are shown at least partly in FIG. 9.

The color television signals recorded by one of the two magnetic heads SP-K1 and LP-K1 with the first azimuth angle AZI1 in one of the track portions $27_n$, $27_{n-2}$, $27_{n-4}$, etc., can only be reproduced from these track portions $27_n$, $27_{n-2}$, $27_{n-4}$, etc., with a satisfactory signal quality by one of these two magnetic heads SP-K1 and LP-K1. The color television signals recorded by one of the two magnetic heads SP-K2 and LP-K2 with the second azimuth angle AZI2 in one of the track portions $27_{n-1}$, $27_{n-3}$, $27_{n-5}$ etc. can only be reproduced from these track portions $27_{n-1}$, $27_{n-3}$, $27_{n-5}$ etc. with a satisfactory signal quality by one of these two magnetic heads SP-K2 and LP-K2. Color television signals in adjacent track portions 27 are recorded on the magnetic tape 7 with mutually different azimuth angles AZI1 and AZI2 in order to reduce crosstalk and thus to improve the signal quality in the reproduced color television signals. When a color television signal is reproduced from a track portion 27 by means of one of the two magnetic heads SP-K1 and SP-K2 having the larger first gap width GAP1, the crosstalk of color television signals from adjacent track portions 27 into the color television signal reproduced by one of the two magnetic heads SP-K1 and SP-K2 is comparatively large.

The four magnetic heads SP-K1, SP-K2, LP-K1 and LP-K2 are connected to four head amplifiers 32, 33, 34 and 35 of a head-amplifier unit 36 via electrically conductive connections 28, 29, 30 and 31, shown diagrammatically. The two head amplifiers 32 and 33 each have an output connected to, respectively, a terminal 37 and a terminal 38 of an SP head switching stage 39 and the two head amplifiers 34 and 35 each have an output connected to, respectively, a terminal 40 and a terminal 41 of an LP head switching stage 42. The color television signals which are reproducible by means of the magnetic heads SP-K1 and SP-K2 are amplified by the head amplifiers 32 and 33 and are available on the terminals 37 and 38 of the SP head switching stage 39. Furthermore, the color television signals which are reproducible by means of the magnetic heads LP-K1 and LP-K2 are amplified by the head amplifiers 34 and 35 and are available on the terminals 40 and 41 of the LP head switching stage 42.

The microcomputer 19 has a third output 43 connected to a control input 44 of the SP head switching stage 39 and to a control input 45 of the LP head switching stage 42. The switching states of the SP head switching stage 39 and the LP head switching stage 42 can be changed by means of head switching pulses HP appearing on the third output 43 of the microcomputer 19. Depending on the switching state of the SP head switching stage 39 the terminal 37 or the terminal 38 is connected to a terminal 46 of the SP head switching stage 39. Depending on the switching state of the LP head switching stage 42 the terminal 40 or the terminal 41 is connected to a terminal 47 of the LP head switching stage 42.

The terminal 46 of the SP head switching stage 39 is connected to the terminal 48 of an SP/LP head switching stage 49 and the terminal 47 of the LP head switching stage 42 is connected to a terminal 50 of the SP/LP head switching stage 49. The microcomputer 19 has a fourth out[ut 51 connected to a control input 52 of the SP/LP head switching stage 49. From its fourth output 51, the microcomputer 19 can supply stage control information TI to the control input 52 of the SP/LP head switching stage 49 to change the switching state of the SP/LP head switching stage 49. Depending on the switching state of the SP/LP head switching stage 49 the terminal 48 or the terminal 50 of this stage is connected to a terminal 53 of the SP/LP head switching stage 49, depending on the head switching pulses HP produced by the microcomputer 19 on its third output 43 and depending on the stage control information TI produced microcomputer 19 on its fourth output 51 the color television signals reproducible by one of the four magnetic heads SP-K1, SP-K2, LP-K1 and LP-K2 can be transferred to the terminal 53 of the head switching stage 49. The fourth output 51 of the microcomputer 19 also constitutes the output of the control information generating unit 4, which is realized by means of the microcomputer 19 in the present case. In this case, the control information generating unit 4 also forms a stage control unit for the SP/LP head switching stage 49.

The magnetic-tape video recorder device 2 further has an entry unit 54 for the activation of at least one normal reproducing mode or at least one special reproducing mode. In a normal reproducing mode, the magnetic tape 7 is driven with the same tape speed $V_T$ as during recording of color television signals. In a special reproducing mode, the magnetic tape 7 is driven with a tape speed $V_T$ which differs from the tape speed during recording of color television signals. The input unit 54 comprises a keyboard-entry unit 55 by means of which the at least one normal reproducing mode and the at least one special reproducing mode, as well as a multiplicity of other modes of the magnetic-tape video recorder device 2, can be activated. The keyboard entry unit 55 can supply mode information BI1 to a processing unit 56. The processing unit 56, at the same time, forms the stage control unit for the SP/LP head switching unit 49 formed by the control information generating unit 4 of the microcomputer 19. The entry unit 54 further comprises a remote control receiver unit 57. By means of a generally known remote control unit, not shown in FIG. 1, it is possible to activate the at least one normal reproducing mode and the at least one special reproducing mode as well as a multiplicity of other modes of the magnetic-tape video recorder device 2. Depending on the mode information received from the remote control unit by the remote control receiver unit 57, the remote control receiver unit 57 can supply mode information BI2 to the processing unit 56 of the control information generating unit 4.

The deck unit 8 comprises a stationary CTL magnetic head 58 which is in scanning engagement with the magnetic tape 7 and which, in known manner, enables CTL pulses to be recorded in and reproduced from a CTL track which extends in the longitudinal direction 9. The CTL pulses reproduced by the CTL magnetic head 58 in a reproducing mode can be applied to a CTL detector stage 59 formed by means of the microcomputer 19. By means of the CTL detector stage 59, it is possible to detect recording-mode information AI, which indicates whether the color television signals reproduced from the track portions 27 on the magnetic tape 7 have been recorded with the normal tape speed $(V_T)_1$ as a standard recording or with the lower tape speed $(V_T)_2$ as a long-play recording. The CTL detector stage 59 can supply this recording mode information AI to the processing unit 56 of the control information generating unit 4.

It is to be noted that in the following description, a special reproducing mode is to be understood to mean a mode in which color television signals of a long-play recording are reproduced at a further tape speed $(V_T)_n$ which differs from the lower tape speed $(V_T)_2$ or at the normal tape speed $(V_T)_1$.

The deck unit 8 further comprises an envelope detector 60 to which a color television signal reproduced by means of one of the two magnetic heads SP-K1 and SP-K2, can be applied from the terminal 46 of the SP head switching stage 39. Furthermore, a color television signal, reproduced by means of one of the two magnetic heads LP-K1 and LP-K2, can be applied from the terminal 47 of the LP head switching stage 42 to the envelope detector 60. By means of the envelope detector 60, it is possible to detect the envelopes of the color television signals applied to it and to generate envelope information HI as detection information which indicates whether the envelope of the color television signal reproduced by one of the two magnetic heads SP-K1 and SP-K2, or that of the color television signal reproduced by one of the two magnetic heads LP-K1 and LP-K2, has a larger amplitude. The envelope information HI consequently indicates which magnetic head SP-K1, SP-K2, LP-K1 or LP-K2 is most suitable for the reproduction of a color television signal from a track portion 27 being scanned. The envelope information HI, which can be generated by the envelope detector 60 as detection information in dependence upon the detected envelopes, can be applied to the processing unit 56 of the control signal generating unit 4 of the microcomputer 19, where the envelope information HI influences the stage control information TI which can be generated on the fourth output 51 of the microcomputer 19 by the control information generating unit 4. The control information generating unit 4, which also forms the stage control unit for the SP/LP head switching stage 49, can supply such stage control information TI to the SP/LP head switching stage 49 that, depending on the envelope information HI, each time those of the color television signals reproduced by the magnetic head SP-K1, SP-K2, LP-K1 or LP-K2 appear on the terminal 53 of the SP/LP head switching stage 49 which are most suitable for the relevant track portion 27.

The processing unit 56 is connected to a first switching control stage 61. The processing unit 56 can supply first switching information to the switching control stage 61. In dependence on the first switching information, the first switching control stage 61 generates head switching pulses HP, which are applied to the third output 43 of the microcomputer 19. The processing unit 56 is further connected to a second switching control stage 62, which forms a part of the control signal generating unit 4. The processing unit 56 can supply second switching information to the second switching control stage 62. In dependence on the second switching information the second switching control stage 61 generates stage control information TI, which is applied to the fourth output 51 of the microcomputer 19.

If a normal reproducing mode has been activated by means of the entry unit 54 and if, in response to the recording mode information AI, the processing unit 56 has detected that the color television signals reproduced from the magnetic tape 7 have been recorded as a standard recording at the normal tape speed $(V_T)_1$, a first operational state of the magnetic-tape video recorder device 2 occurs. In the first operational, state the processing unit 56 produces such motor control signals on the first output 20 and on the second output 22 of the microcomputer 19 that the motors 17 and 24 are controlled in such a manner that the magnetic heads SP-K1 and SP-K2 scan the magnetic tape 7 along the adjacent track portions 27. In the first operational state, the processing unit 56 further supplies such first switching information to the first switching control stage 61 that the head switching pulses HP supplied by the first switching control stage 61 change the switching state of the SP head switching stage 39 so as to connect the magnetic heads SP-K1 and SP-K2 to the terminal 46 of the SP head switching stage 39 in cyclic succession. In this first operational state, the processing unit 56 further supplies such second switching information to the second switching control stage 62 that the stage control information TI, supplied by the second switching control stage 62, changes the switching state of the SP/LP head switching stage 49 so as to connect the terminal 48 of the SP/LP head switching stage 49 to the terminal 53 of the SP/LP head switching stage 49. In the first operational state, the color television signal reproduced by means of the magnetic head SP-K1 is supplied to the terminal 53 of the SP/LP head switching stage 49 as long as the magnetic head SP-K1 scans a track portion 27, and the color television signal reproduced by means of the magnetic head SP-K2 is supplied to the terminal 53 of the SP/LP head switching stage 49 as long as the magnetic head SP-K2 scans a further track portion 27.

When a normal reproducing mode has been activated by means of the entry unit 54 and when, on the basis of the recording mode information AI, the processing unit 56 detects that the color television signals reproduced from the magnetic tape 7 have been recorded with a lower tape speed $(V_T)_2$ as a long-play recording, a second operational state of the magnetic-tape video recorder device 2 occurs. In the second operational state, the processing unit 56 produces such motor control signals on the first output 20 and on the second output 22 of the microcomputer 19 that the motors 17 and 24 are controlled in such a manner that the magnetic heads LP-K1 and LP-K2 scan the magnetic tape 7 along the adjacent track portions 27. In this second operational state, the processing unit 56 further supplies such first switching information to the first switching control stage 61 that the head switching pulses HP supplied by the first switching control stage 61 change the switching state of the LP head switching stage 42 so as to connect the magnetic heads LP-K1 and LP-K2 to the terminal 47 of the LP head switching stage 42 in cyclic succession. In this second operational state, the processing unit 56 further supplies such second switching information to the second switching control stage 62 that the stage control information TI, supplied by the second switching control stage 62, changes the switching state of the SP/LP head switching stage 49 so as to connect the terminal 50 of the SP/LP head switching stage 49 to the terminal 53 of the SP/LP head switching stage 49. In the second operational state, the color television signal reproduced by means of the magnetic head LP-K1 is supplied to the terminal 53 of the SP/LP head switching stage 49 as long as the magnetic head LP-K1 scans a track portion 27 of the magnetic tape 7, and the color television signal reproduced by means of the magnetic head LP-K2 is supplied to the terminal 53 of the SP/LP head switching stage 49 as long as the magnetic head LP-K2 scans a further track portion 27 on the magnetic tape 7.

When a special reproducing mode has been activated by means of the entry unit 54 and when, on the basis of the recording mode information AI, the processing unit 56 detects that the color television signals reproduced from the magnetic tape 7 have been recorded with the lower tape speed $(V_T)_2$ as a long-play recording, a third operational state of the magnetic-tape video recorder device 2 occurs. In the third operational state, the processing unit 56 produces such motor control signals on the first output 20 and on the second output 22 of the microcomputer 19 that the motors 17 and 24 are controlled in such a manner that the magnetic heads SP-K1, SP-K2, LP-K1 and LP-K2 scan the magnetic tape 7 along a special track portion 63 shown in FIG. 9 in accordance with the selected special reproducing mode, this special track portion in the present case intersects the adjacent track portions $27_n$, $27_{n-1}$ and $27_{n-2}$. During one half revolution of the drum section 26, the special track portion 63 is scanned either by the first head pair SP-K1, LP-K2 or by the second head pair SP-K2, LP-K1. When the special track portion 63, which intersects the adjacent track portions $27_n$, $27_{n-1}$ and $27_{n-2}$, is scanned by the first head pair SP-K1, LP-K2, the processing unit 56 initially supplies such first switching information to the first switching control stage 61 and to the second switching control stage 62 that the color television signals reproduced from the track portion $27_n$, in which a color television signal has been recorded with the first azimuth angle AZI1, by the magnetic head SP-K1, which has the first azimuth angle AZI1, is supplied to the terminal 53 of the SP/LP head switching stage 49. While the magnetic tape 7 is being scanned by the first head pair SP-K1, LP-K2 along the special track portion 63, a transition from the track portion $27_n$ to the track portion $27_{n-1}$ occurs initially, in which last-mentioned track portion a color television signal has been recorded with the second azimuth angle AZI2, which signal cannot be reproduced by means of the magnetic head SP-K1, which has the first azimuth angle AZI1, as a result of which the amplitude of the envelope of the color television signal reproduced by means of the magnetic head SP-K1 decreases strongly. However, the magnetic head LP-K2, which has the second azimuth angle AZI2, can reproduce a color television signal recorded in the track portion $27_{n-1}$ with the second azimuth angle AZI2, as a result of which, the amplitude of the envelope of the color television signal reproduced by means of the magnetic head LP-K2 increases strongly. At the transition from reproduction from the track portion $27_n$ to the track portion $27_{n-1}$, a discontinuity appears in the color television signals reproduced by the magnetic head SP-K1 and subsequently by the magnetic head LP-K2 due to the strong decrease and the strong increase of the amplitude of the envelope.

The above-mentioned discontinuity in the television signals reproduced by the magnetic head SP-K1 and subsequently by the magnetic head LP-K2 can be detected by means of the envelope detector 60, which can supply corresponding envelope information HI to the processing unit 56 of the control information generating unit 4. When such envelope information HI appears as a result of the detected discontinuity, the processing unit 56 supplies such second switching information to the second switching control stage 62 that this stage produces such stage control information TI that the switching state of the SP/LP head switching stage 49 is changed in such a way that the terminal 50 of the SP/LP head switching stage 49 is connected to the terminal 53 of the SP/LP head switching stage 49 and, consequently, the color television signal reproduced by the magnetic head LP-K2 is applied to the terminal 53.

During scanning of the special track portion 63 by the first head pair SP-K1, LP-K2 in the third operational state, a further transition from the track portion $27_{n-1}$ to the track portion $27_{n-2}$ occurs. This transition likewise produces a discontinuity in the color television signals reproduced by the magnetic head LP-K2 and subsequently by the magnetic head SP-K1. This discontinuity in the reproduced color television signals can also be detected by means of the envelope detector 60, after which the envelope detector 60 can supply corresponding envelope information HI to the processing unit 56 of the control information generating unit 4. When such envelope information HI as a result of the detected discontinuity occurs, the processing unit 56 supplies such switching information to the second switching control stage 62 that this stage supplies stage control information TI so as to change the switching state of the SP/LP head switching stage 49 in such a manner that the color television signal reproduced by the magnetic head SP-K1 appears on the terminal 53 of the SP/LP head switching stage 49.

Depending on the activated special reproducing mode, the first head pair SP-K1, LP-K2 or the second head pair SP-K2, LP-K1 scans the magnetic tape 7 along a special track portion 63, the relevant special track portion intersecting a larger or smaller number of track portions 27. At the transition from one track portion 27 to an adjacent track portion 27, stage control information TI is supplied to the SL/LP head switching stage 49 by the control information generating unit 4, which, in the present case, advantageously also forms a stage control unit for the SP/LP head switching stage 49, so that in the activated special reproducing mode, the reproduction is switchable from a magnetic head of the first head pair SP-K1, LP-K2 or of the second head pair SP-K2, LP-K1 to the other magnetic head of the same head pair at the transition from a track portion 27 to an adjacent track portion 27.

When, in a system as shown in FIG. 1, a special reproducing mode has been activated in which the first head pair SP-K1, LP-K2 and the second head pair SP-K2, LP-K1 scan the magnetic tape 7 along a special track portion 63 which intersects only a few track portions 27, the tape speed $(V_T)_n$ in the special reproducing mode will not differ substantially from the lower tape speed $(V_T)_2$ with which the color television signals had been recorded in the track portions 27. In such a special reproducing mode, the special track portion 63 may, for example, intersect only the track portion $27_n$ and the track portion $27_{n-1}$. In such a case, the control information generating unit 4 of the microcomputer 19 can supply stage control information TI to the SP/LP head switching stage 49 at a certain predetermined instant $T_p$, namely, after one of the magnetic heads SP-K1, SP-K2, LP-K1 or LP-K2 has scanned half the track portion $27_n$. This predetermined instant $T_p$, which, in the present case, is determined by the microcomputer 19 and is not influenced by envelope information supplied by an envelope detector, corresponds to the transition from the track portion $27_n$ to the adjacent track portion $27_{n-1}$ where a discontinuity in the reproduced color television signals occurs. This generation of stage control information TI at certain predetermined instants $T_p$ by means of a microcomputer is particularly simple and, consequently, advantageous, but it can only be used advantageously in those special reproducing modes in which the relevant special track portion 63 intersects only a small number of track portions 27, i.e., when the tape speed $(V_T)_n$ in the special reproducing mode does not differ too much from the lower tape speed $(V_T)_2$.

As is shown in FIG. 9, each track portion 27 comprises a given number of line signals 64 of a color television signal recorded in the relevant track portion 27, of which the line signals $64_1$ to $64_m$ are shown at least partly. The line signals 64 in a track portion 27, which adjoin one another in a longitudinal direction R of the track portions 27, have a different configuration in relation to the color signal of the color television signals recorded in the track portion 27, a first configuration of the color signal in a line signal 64 being marked with a plus sign (+) and a second configuration of the color signal in a line signal 64 being marked with a minus sign (−). In the case of the system 1 as shown in FIG. 1, the color television signals recorded on and reproducible from the magnetic tape 7 are signals in accordance with the PAL color television system. In accordance with the PAL color television system, the color signals have a configuration which differs with respect to the phase (+, −) of a color subcarrier, which exhibits a first phase (−) or a second phase (+).

In the case of a long-play recording—as is shown in FIG. 9—the line signals 64 of adjacent track portions 27 are recorded so as to be shifted relative to one another in the longitudinal direction R of the track portions 27. At the transition of the reproduction of a line signal $64_8$ of the track portion $27_n$, whose color subcarrier exhibits the first phase (−), to a line signal $64_7$ of the track portion $27_{n-1}$, whose color subcarrier exhibits the second phase (+), a phase jump (−→+) in the phase of the color subcarrier of the reproduced color signals occurs, which forms a discontinuity in the color signal and which is referred to as a color sequence error.

It is to be noted that in the third operational state, each time that a discontinuity, as stated hereinbefore, occurs as a result of a strong decrease or increase in amplitude of the envelopes of the reproduced color television signal, also a discontinuity in the color signal of the reproduced color television signals is produced as a result of a phase jump in the phase of the color subcarrier. Thus, in the third operational state, both the first-mentioned discontinuity and the last-mentioned discontinuity are indicative of a color sequence error in the reproduced color television signals.

The reproduced color television signals supplied to the terminal 53 of the SP-LP head switching stage 49 can be applied to a recording/reproduction switch 66. The magnetic-tape video recorder device 2 of the system 1 in FIG. 1 is also adapted to record color television signals, which can be supplied from a recording color-television-signal-processing unit 69 to a REC input of the recording/reproduction switch 66. In at least one recording mode which can be activated by means of the entry unit 54, the microcomputer 19 supplies such third switching information ZI from its fifth output 67 to the control input 68 of the recording/reproduction switch 66 that the REC terminal is connected to the terminal 65 and the color television signals to be recorded and supplied by the recording color-television-signal-processing unit 69 can be recorded on the magnetic tape 7. In the recording mode, the color television signals to be recorded can be applied, in a manner known per se, from the recording color-television-signal-processing unit 69 to the magnetic heads SP-K1, SP-K2, LP-K1 and LP-K2 via the recording/reproduction switch 66, via the SP/LP head switching stage 49 and further via recording amplifiers, which are not shown in FIG. 1 for the sake of simplicity.

In a reproducing mode, the microcomputer 19 supplies such third switching information ZI from its fifth output 67 to the control input 68 of the recording/reproduction switch 66 that the terminal 65 is connected to a PB terminal of the recording/reproduction switch 66. The PB terminal of the recording/reproduction switch 66 is connected to an input 70 of a reproduction color-television-signal-processing unit 71 of the magnetic-tape video recorder device 2. In a reproducing mode, the reproduced color television signals appearing on the terminal 53 of the SP/LP head switching stage 49, can be applied to the input 70 of the reproduction color-television-signal-processing unit 71 via the recording/reproduction switch 66 of said processing unit 71. The reproduction color-television-signal-processing unit 71 comprises a color signal processing unit 72 and a luminance signal processing unit 73, to which color signal processing unit 72 and luminance signal processing unit 73, the reproduced color television signal supplied to the input 70 of the reproduction color-television-signal-processing unit 71 can be applied.

In the color signal processing unit 72, the color signal C is extracted from a reproduced color television signal by means of a low-pass filter and is further processed in a basically known manner. Advantageously, the color signal processing unit 72 in the system 1 as shown in FIG. 1 does not require and therefore does not comprise any correction means for the correction of a color sequence error, which will be elucidated hereinafter.

In the luminance processing unit 73, the luminance signal Y is extracted from a reproduced color television signal by means of a high-pass filter and is further processed in a basically known manner.

The color signal C processed in the color signal processing unit 72 and the luminance signal Y processed in the luminance signal processing unit 73 are applied to an adder stage 74, which adds the processed color signal C and the processed luminance signal Y to one another so as to form a processed color television signal, and which can supply the processed color television signal to an input 75 of the color television receiving device 3.

The color television receiving device 3 of the system 1 has a color-television-signal-processing unit 76 which comprises a luminance signal processing unit 77 and a color signal processing unit 78. The color television signal applied to the input 75 of the color television receiving device 3 can be applied to a filter unit 79, which unit extracts from the applied color television signal the color signal C, which can be applied to an input 80 of the color signal processing unit 78, and the luminance signal Y, which can be applied to an input 81 of the luminance signal processing unit 77. A luminance signal Y applied to the luminance signal processing unit 77 is processed in accordance with a method which is known for a PAL luminance signal and which is not described in more detail here, after which the luminance signal Y processed by means of the luminance signal processing unit 77 can be applied to a matrix stage 82.

The color television signal applied to the input 75 of the color television receiving device 3 can further be applied to a synchronization signal separating stage 83 (sync separator stage 83), which extracts, from the applied color television signal, a horizontal synchronization signal H (line pulses H) and a vertical synchronization signal V (picture pulses V). The sync separator stage 83 can supply the picture pulses V on an output 84 and the line pulses H, on an output 85. The line pulses H available on the output 85 of the sync separator stage 83 and shown diagrammatically in FIG. 4A, can be applied to an input 86 of the color signal processing unit 78.

Figure 2:
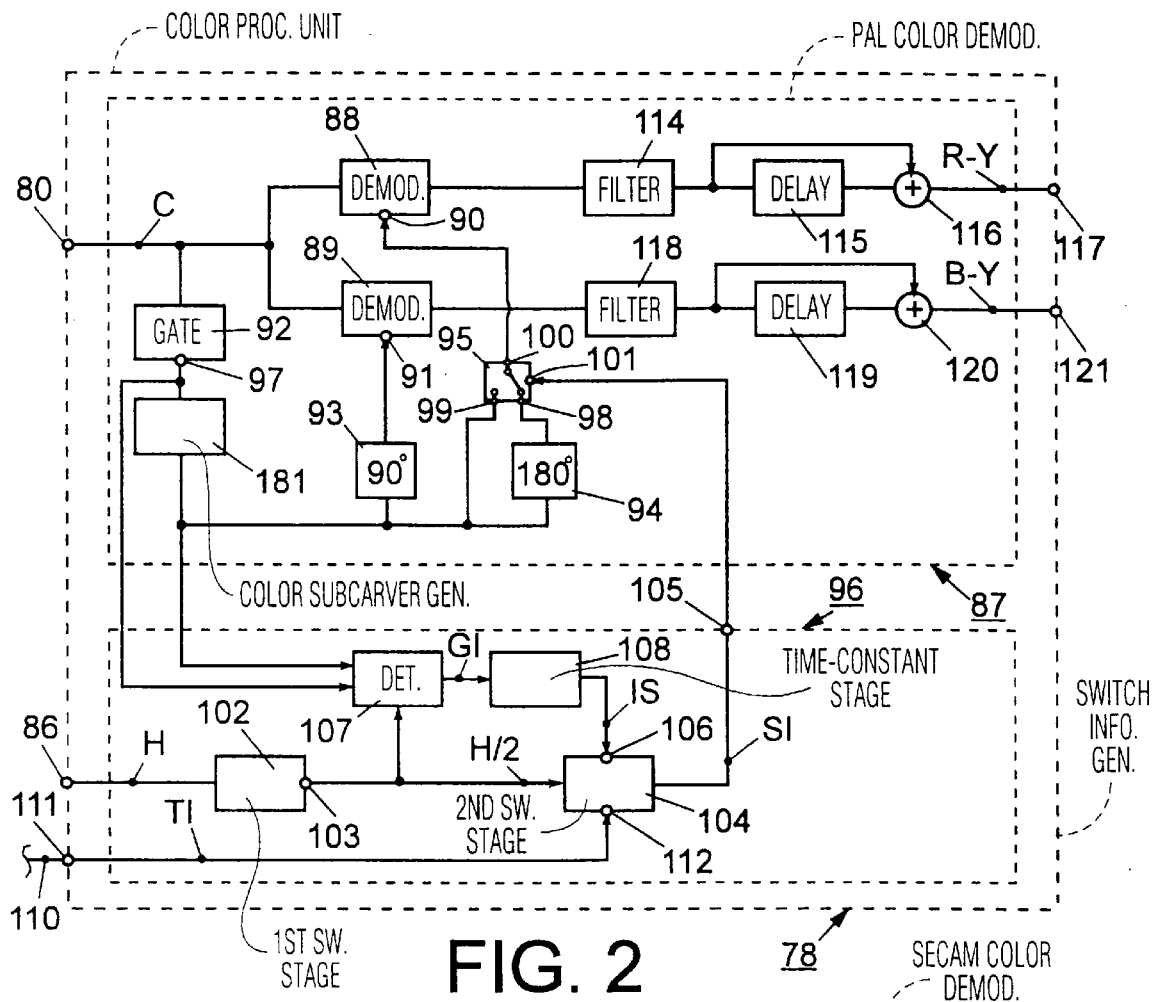
FIG. 2 shows a color signal processing unit of the color television receiving device of the system shown in FIG. 1, this unit comprising a PAL color signal demodulator for demodulating color signals in accordance with the PAL color television system.

FIG. 2 shows the color signal processing unit 78 of the color television receiving device 3 of the system as shown in FIG. 1. In the present case, the color signal processing unit 78 takes the form of an integrated circuit. The color signal processing unit 78 is adapted to demodulate color television signals in accordance with the PAL color television system, for which purpose it comprises a PAL color signal demodulator 87. The color signal C applied to the input 80 of the color signal processing unit 78 can be applied to an R-Y demodulator 88 and a B-Y demodulator 89 of the PAL color signal demodulator 87. In accordance with the PAL color television system, an R-Y color signal component of the color signal C is demodulated by means of an alternating-phase color subcarrier, which can be applied to an input 90 of the R-Y demodulator 88. In accordance with the PAL color television system, a B-Y color signal component of the color signal C is demodulated by means of a constant-phase color subcarrier, which can be applied to an input 91 of the B-Y demodulator 89.

To generate a constant-phase color subcarrier and an alternating-phase color subcarrier, the PAL color signal demodulator 87 comprises a color subcarrier gate 92, a color subcarrier generator 181, preferably in the form of a PLL stage, a first phase control stage 93, a second phase control stage 94 and a color subcarrier phase switch 95, and the color signal processing unit 78 comprises a switching information generating unit 96. The color signal C applied to the input 80 of the color signal processing unit 78 can further be applied to the color subcarrier gate 92, which separates the reproduced color subcarrier from the color signal C and supplies it to an output 97 of the color subcarrier gate 92.

The reproduced color subcarrier, available on the output 97 of the color subcarrier gate 92, can be applied to the color subcarrier generator 181, which derives from the reproduced color subcarrier, which appears periodically but only temporarily in the reproduced color signal C, a continuous wave having the frequency of the reproduced color subcarrier and having a phase between the first phase (−) and the second phase (+) of the reproduced color subcarrier, which continuous wave can be applied to the first phase control stage 93, which shifts the phase of the continuous wave through 90°. The continuous wave whose phase has been shifted through 90° can be applied to the input 91 of the B-Y demodulator as a constant-phase color subcarrier.

The continuous wave generated by the color subcarrier generator 181 can further be applied to the second phase control stage 94, which shifts the phase of the continuous wave of the reproduced color subcarrier through 180°. The continuous wave whose phase has been shifted through 180° can be applied to an input 98 of the color subcarrier phase switch 95. The continuous wave supplied by the color subcarrier generator 181 can further be applied to an input 99 of the color subcarrier phase switch 95. Depending on the switching state of the color subcarrier phase switch 95, the continuous wave whose phase has not been influenced and which has been applied to the input 99, or the continuous wave whose phase has been shifted through 180° and which has been applied to the input 98, is available as the alternating-phase color subcarrier on an output 100 of the color subcarrier phase switch 95, and can be applied to the input 90 of the R-Y demodulator 88. The switching state of the color subcarrier phase switch 95 can be changed by switching information SI, which is shown in FIG. 4E and which can be applied to a control input 101 of the color subcarrier phase switch 95, thus enabling the occurrence of color sequence errors in a demodulated color signal to be avoided.

To generate the switching information SI, the color signal processing unit 78 comprises the switching information generating unit 96. The line pulses H, applied to the input 86 of the color signal processing unit 78 and shown in FIG. 4A, can be applied to a first switching stage 102 of the switching information generating unit 96. The first switching stage can produce a switching signal H/2 on an output 103, which signal has half the line frequency, i.e., half the frequency of the line pulses H, and which is shown in FIG. 4B. Half the period of the switching signal H/2, which is equal to the on-time of the switching signal H/2, corresponds to the line period $T_H$ of a line, i.e. the reproduction time of a line signal 64 in a reproducing mode and, consequently, the reproduction time of a color signal with a constant-phase color subcarrier.

The switching signal H/2 on the output 103 of the first switching stage 102 can be applied to a second switching stage 104. In the second switching stage 104, the switching signal applied to this stage 104 can be shifted in phase. The switching signal H/2, which has been shifted in phase if necessary, can be supplied to an output 105 of the switching information generating unit 96 as the switching information SI. The switching information SI appearing on the output 105 can be applied to the input 101 of the color subcarrier phase switch 95 and serves to change the switching state of the color subcarrier phase switch 95. When a track portion 27 is scanned, the phase of the alternating color subcarrier is changed during each transition from the reproduction of a line signal 64 in the track portion 27 to an adjacent line signal 64 in this track portion 27 by one of the magnetic heads SP-K1, SP-K2, LP-K1 and LP-K2 due to the cyclic change of the switching state of the color subcarrier phase switch 95. The phase of the alternating-phase color subcarrier is changed again by means of the switching information SI after each half period ($T_H$) of the switching signal H/2.

Directly after activation of a reproducing mode, the alternating-phase color subcarrier, which can appear on the output 100 of the color subcarrier phase switch 95, is either in phase with the reproduced color subcarrier or in phase opposition to the reproduced color subcarrier, depending upon the initial switching state of the color subcarrier phase switch 95. When the alternating-phase color subcarrier and the reproduced color subcarrier are in phase and are phase-inverted, the R-Y color signal component is demodulated correctly in the R-Y demodulator. However, when the alternating-phase color subcarrier and the reproduced color subcarrier are not in phase, i.e., in phase opposition, the polarity of the switching information SI is changed by an initial signal IS which can be applied to an input 106 of the switching stage 104, so as to restore phase coincidence between the alternating-phase color subcarrier and the reproduced color subcarrier.

To generate the initial signal IS, the reproduced color subcarrier appearing on the output 97 of the color subcarrier gate 92 can be applied to a detector 107, in the present case, a phase detector. The continuous wave generated by the color subcarrier generator 181 can also be applied to the detector 107. Furthermore, the switching signal H/2, appearing on the output 103 of the first switching stage 102, can be applied to the detector 107. By comparison of the phase of the reproduced color subcarrier with the phase of the continuous wave, it is possible to derive phase information P, which indicates whether the reproduced color subcarrier exhibits the first phase (−) or the second phase (+). By evaluating the phase information P and detecting the phase of the switching signal H/2, which determines the switching state of the color subcarrier phase switch 95, the detector 107 can supply anti-phase information GI to a time-constant stage 108 if, due to the initial switching state of the color subcarrier phase switch 95, the alternating-phase color subcarrier and the reproduced color subcarrier are in phase opposition to one another. After the anti-phase information GI has appeared a given number of times, the time-constant stage 108 supplies the initial signal IS, shown in FIG. 4D, which has an edge 109. When the edge 109 appears, the phase or polarity of the switching information SI shown in FIG. 4E is changed upon the edge referenced 169, as a result of which the switching state of the color subcarrier phase switch 95 is also changed and, consequently, the alternating-phase color subcarrier is now in phase with the reproduced color subcarrier and is subsequently switched in phase synchronism. The time-constant stage 108 does not supply an initial signal IS until the anti-phase information has appeared several times, in order to preclude that noise in only one line signal 64 already causes the phase of the alternating-phase color subcarrier to be changed. The reliability of the detection whether the reproduced color subcarrier is in phase opposition to the alternating-phase color subcarrier is increased by the provision of the time-constant stage 108.

In the system as shown in FIG. 1, it is advantageously possible, in the third operational state, to correct a color sequence error, which occurs at the transition from a track portion 27 to an adjacent track portion 27 and which is indicated by a discontinuity in the reproduced color television signal, by an additional phase change of the switching information SI, and thus, an additional phase change of the alternating-phase color subcarrier, namely, upon the occurrence of stage control information TI which is indicative of a discontinuity, which is applied to and processed in the switching information generating unit 96 of the color television receiving device 3 as control information TI, by means of which the correction of color sequence errors in a reproduced color signal can be initiated. For this purpose, the control information generating unit 4 of the system 2 is connected to cooperate with the switching information generating unit 96 of the color television receiving device 3 via an electrically conductive connection 110 so as to allow the control information TI from the control information generating unit 4 to be applied to the switching information generating unit 96 via the electrically conductive connection 110 and to be processed therein, enabling the switching information SI, which can be generated by means of the switching information generating unit 96, to be influenced by the control information TI. For this purpose, the input 111 of the color signal processing unit 78, which forms a control information terminal of the integrated circuit, is connected to the fourth output 51 of the microcomputer 19 via the electrically conductive connection 110. The control information TI applied to the input 111 of the color signal processing unit 78 can be applied to an input 112 of the second switching stage 104. When the edge 113, shown in FIG. 4C, appears in the control information TI, which forms the control information TI for the switching information generating unit 96, the phase of the switching information SI, which can be supplied by the second switching stage 104, is additionally changed in accordance with the edge 170 in FIG. 4E, and thus, the phase of the alternating-phase color subcarrier is additionally changed at the transition from a track portion 27 to an adjacent track portion 27, so that after this transition from a track portion 27, to an adjacent track portion 27 the alternating-phase color subcarrier is in phase with the reproduced color subcarrier and is subsequently switched in phase by means of the color subcarrier phase switch 95. The switching information generating unit 96—as is apparent from the above explanation—is adapted to generate a rectangular switching signal H/2 of half the line frequency as switching information SI, and to generate a 180° phase shift in the rectangular switching signal H/2 as additional switching information upon receipt of control information TI applied to it.

The R-Y color signal component, demodulated by the R-Y demodulator 88 with the aid of the alternating-phase color subcarrier, can be applied to a first low-pass filter 114, which filters any undesired signal components out of the demodulated R-Y color signal component. In accordance with the PAL color television system, the filtered R-Y color signal component is applied to a first 1-H delay stage 115, which delays the R-Y color signal component by one line period $T_H$. Subsequently, the delayed R-Y color signal component is applied to a first adder stage 116, in which the delayed R-Y color signal component is added to the likewise applied non-delayed R-Y color signal component by means of the first adder stage 116 for the purpose of comb-filtering. The comb-filtered R-Y color signal component is available on a first output 117 of the color signal processing unit 78.

The B-Y color signal component, demodulated by the B-Y demodulator 89 with the aid of the constant-phase color subcarrier, can be applied to a second low-pass filter 118, which filters any undesired signal components out of the demodulated B-Y color signal component. In accordance with the PAL color television system, the filtered B-Y color signal component is applied to a second 1-H delay stage 119, which delays the B-Y color signal component by one line period $T_H$. Subsequently, the delayed B-Y color signal component is applied to a second adder stage 120, in which the delayed B-Y color signal component is added to the likewise applied non-delayed B-Y color signal component by means of the second adder stage 120 for the purpose of comb-filtering. The comb-filtered B-Y color signal component is available on a second output 121 of the color signal processing unit 78.

The R-Y color signal component appearing on the first output 117 and the B-Y color signal component appearing on the second output 121 can be applied to the matrix stage 82. In the matrix stage 82 the signals applied to this stage 82 are processed to form color television signals which can be displayed by means of a picture display device 122, i.e., a cathode-ray tube. To display the color television signals, the picture display device 122 further receives the picture pulses V appearing on the output 84 of the sync separator stage 83 and the line pulses H appearing on the output 85 of the sync separator stage 83.

In the system as shown in FIG. 1, it is thus achieved advantageously that in the color signal processing unit 72 of the reproduction color-television-signal-processing unit 71, means for the correction of a color sequence error can be dispensed with because the correction of a color sequence error can be effected directly in the color signal processing unit 78 of the color television receiving device 3, namely, by an additional change of the switching state of the color subcarrier phase switch 95 when control information TI occurs, which is advantageously applied to the color television receiving device 3 via the electrically conductive connection 110. This results in a low-cost system 1 for the reproduction of color television signals, which mainly utilizes means that are present anyway in color television receiving device 3 for the correction of color sequence errors occurring in the reproduced color television signals.

Figure 3:
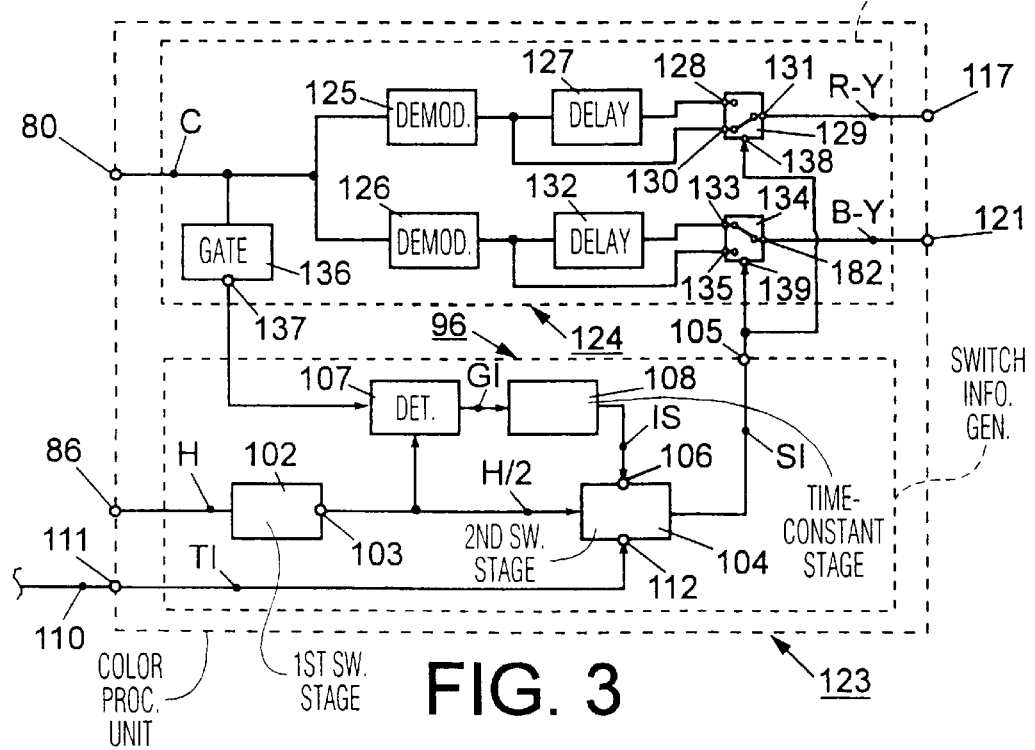
FIG. 3 shows a color signal processing unit of the color television receiving device of a system in accordance with a second embodiment of the invention adapted to process color television signals in accordance with the SECAM color television system, which unit comprises a SECAM color signal demodulator for demodulating color signals in accordance with the SECAM color television system.

FIG. 3 shows a color signal processing unit 123, likewise implemented as an integrated circuit and adapted to demodulate color signals C in accordance the SECAM color television system, this unit having been included in a system 1 in accordance with a second embodiment of the invention, whose construction substantially corresponds to the construction of the system as shown in FIG. 1, except for the color signal processing unit 123. The magnetic-tape video recorder device 2 of this system 1 is capable of reproducing color television signals from the magnetic tape 7 which are in accordance with the SECAM color television system. Color signals C of the reproduced and processed color television signals can be applied to the input 80 of the color signal processing unit 123, which comprises a SECAM color signal demodulator 124. The color signal C applied to the input 80 can be supplied to an R-Y demodulator 125 and a B-Y demodulator 126 of the SECAM color signal demodulator 124.

In accordance with the SECAM color television system, the R-Y color signal component of the color signal C is demodulated in the R-Y demodulator 125 by means of a first color carrier present in the color signal C and having a first center frequency, and the B-Y color signal component of the color signal C is demodulated in the B-Y demodulator 126 by means of a second color carrier present in the color signal C and having a second center frequency. The demodulated R-Y color signal component can be applied from the R-Y demodulator 125 to a first 1-H delay stage 127, which delays the R-Y color signal component by one line period $T_H$ and, subsequently, to a first input 128 of an R-Y color signal delay switch 129. The demodulated R-Y color signal component can further be applied from the R-Y color signal demodulator 125 to a second input 130 of the R-Y color signal delay switch 129. Depending on the switching state of the R-Y color signal delay switch 129, either the first input 128 or the second input 130 is connected to an output 131 of the R-Y color signal delay switch 129. The output 131 of the R-Y color signal delay switch 129 is connected to the output 117 of the color signal processing unit 123.

The demodulated B-Y color signal component the color signal C can be applied from the B-Y demodulator 126 to a second 1-H delay stage 132, which delays the B-Y color signal component by one line period $T_H$ and, subsequently, to a first input 133 of a B-Y color signal delay switch 134. The demodulated B-Y color signal component can further be supplied from the B-Y demodulator 126 to a second input 135 of the B-Y color signal delay switch 134. Depending on the switching state of the B-Y color signal delay switch 134, either the first input 133 or the second input 135 is connected to an output 182 of the B-Y color signal delay switch 134. The output 182 of the B-Y color signal delay switch 134 is connected to the output 121 of the color signal processing unit 123.

In each line period $T_H$, a color signal C of a color television signal, in accordance with the SECAM color television system, comprises an R-Y color signal component in one line signal 64 and a B-Y color signal component in a following line signal 64. In order to ensure that constantly an R-Y color signal component is available on the output 117 of the color signal processing unit 123, the R-Y color signal component is transferred to the output 117 via the R-Y color signal delay switch 129 without being delayed when the color signal C includes an R-Y color signal component, and the R-Y color signal component is transferred to the output 117 via the R-Y color signal delay switch 129 delayed by the line period $T_H$ with the aid of the 1-H delay stage 127 when the color signal C includes a B-Y color signal component. A B-Y color signal component can be applied from the SECAM color signal demodulator 124 to the output 121 in a similar manner.

The color signal C applied to the input 80 of the color signal processing unit 123 can further be supplied to a color carrier gate 136, which extracts the color carrier of the first center frequency or the color carrier of the second center frequency from the color signal C and supplies it to an output 137 of the color carrier gate 136.

The switching information SI, appearing on the output 105 of the switching information generating unit 96, can be applied to a control input 138 of the R-Y color signal delay switch 129 and to a control input 139 of the B-Y color signal delay switch 134, switching information SI defining the switching state of the R-Y color signal delay switch 129 and the switching state of the B-Y color signal delay switch 134. The switching information generating unit 96 of the color signal processing unit 123, as shown in FIG. 3, basically corresponds to the switching information generating unit 96 of the color signal processing unit 78 as shown in FIG. 2, but the detector 107 is a phase and frequency detector. The color carrier appearing on the output 137 of the color carrier gate 136 can be applied to the detector 107. By detecting the color carrier frequency of the instantaneously reproduced color carrier, and detecting the phase of the switching signal H/2, which defines the switching state of the two color signal delay switches 129 and 134, and by combining the two detection results, the detector 107 can supply anti-phase information GI to the time-constant stage 108. The detector 107 supplies anti-phase information GI when the detector 107 detects the color carrier of the first center frequency, which frequency together with an R-Y color signal component is present in the color signal C, and when, on the basis of the detected phase of the switching signal H/2, the detector 107, at the same time, detects that the R-Y color signal delay switch 129 supplies the delayed R-Y color signal component on its output 131.

In order to increase the immunity to interference, the time-constant stage 108 does not supply an initial signal IS to the second switching stage 104 until the anti-phase information GI has been detected a number of times. The initial signal IS causes the phase of the switching information formed by a switching signal H/2 of half the line frequency to be shifted through 180°. As a result of this, the switching state of the color signal delay switches 129 and 134 is changed in such a manner that the delayed color signal components can be supplied to color signal delay switches 129 and 134 exactly when the respective other color signal components appear in the color signal C.

In the third operational state, already described with reference to FIGS. 1 and 2, it is advantageously possible to correct a color sequence error, which occurs at the transition from a track portion 27 to an adjacent track portion 27 and which is indicated by a discontinuity in the reproduced color television signals, by an additional phase shift of the switching information SI, and thus an, additional change of the switching state of the two color signal delay switches 129 and 134, namely, upon the occurrence of stage control information TI which is indicative of a discontinuity, which is applied to and processed in the switching information generating unit 96 of the color television receiving device 3 as control information TI, by means of which the correction of color sequence errors in a reproduced color signal can be initiated. For this purpose, the control information generating unit 4 of the system 1 is connected to cooperate with the switching information generating unit 96 of the color television receiving device 3 via the electrically conductive connection 110 so as to allow the control information TI from the control information generating unit 4 to be applied to the switching information generating unit 96 via the electrically conductive connection 110 and to be processed therein, enabling the switching information SI, which can be generated by means of the switching information generating unit 96, to be influenced by the control information TI. The control information TI, applied to the input 111 of the color signal processing unit 123, can be applied to an input 112 of the second switching stage 104. When the edge 113, shown in FIG. 4C, appears in the control information TI, which forms the control information TI for the switching information generating unit 96, the phase of the switching information SI, which can be supplied by the second switching stage 104, is additionally changed in accordance with the edge 170 in FIG. 4E, and thus, the switching state of the color signal delay switches 129 and 134 is additionally changed at the transition from a track portion 27 to an adjacent track portion 27, so that a correctly timed appearance of the R-Y color signal component on the output 117 and of the B-Y color signal component on the output 121 is also guaranteed after this transition from a track portion 27 to an adjacent track portion 27.

Advantageously, this provides a correction of color sequence errors in color television signals in accordance with the SECAM color television system without separate means for this being required in the reproduction color-television-signal-processing unit 71 of the magnetic-tape video recorder device 2.

FIG. 5 shows an envelope detector 60 in the form of a peak detector, used in a system in accordance with a third embodiment of the invention. For the remainder, this system is similar to the system 1 described with reference to FIGS. 1 and 2. Reproduced color television signals appearing on the terminal 47 of the LP head switching stage 42 can be applied to the envelope detector 60. A first diode 141 has its anode connected to the input 140 and its cathode to an input 142 of a first buffer stage 143. The first buffer stage 143 has its input 142 connected to a reference potential 145 via a first capacitor 144. The first buffer stage 143 further has its input 142 connected to a noninverting input 146 of a comparator 147.

Furthermore, a second diode 148 has its cathode connected to the input 140 of the envelope detector 60 and its anode to an input 149 of a second buffer stage 150. The second buffer stage 150 has its input 149 connected to the reference potential 145 via a second capacitor 151.

The first buffer stage 143 has an output 152 connected to an inverting input 154 of the comparator 147 via a first resistor 153. The second buffer stage 150 has an output 155 connected to the inverting input 154 of the comparator 147 via a second resistor 156. Envelope information HI, which can appear on an output 157 of the comparator 147, can be applied to the processing unit 56 of the control information generating unit 4.

By means of the envelope detector 60, it is possible to generate envelope information HI as detection information which indicates whether the color television signal reproduced by one of the two magnetic heads SP-K1 and SP-K2 or the color television signal reproduced by one of the two magnetic heads LP-K1 and LP-K2 has a better signal quality. On the basis of a strong deterioration in signal quality of a reproduced color television signal, it is possible, in the third operational state already explained hereinbefore, to detect the transition of a head pair SP-K1, LP-K2 or SP-K2, LP-K1 from a track portion 27 to an adjacent track portion 27, and thus, a discontinuity in the reproduced color television signal. The signal quality is determined by the amplitude of the envelope but also by the level of the crosstalk in the reproduced color television signal.

In the third operational state, in which the color television signals reproduced from the magnetic tape 7 originate from a long-play recording made by means of the magnetic heads LP-K1 and LP-K2, the crosstalk in the color television signals reproduced by means of the magnetic heads SP-K1 and SP-K2 is larger than the crosstalk in the color television signals reproduced by means of the magnetic heads LP-K1 and LP-K2 because the magnetic heads SP-K1 and SP-K2 have the larger first gap width GAP1.

The envelope detector 60 as shown in FIG. 5 is adapted to generate such envelope information HI that the control information generating unit 4 always supplies such stage control information TI that, when the envelope of the color television signals reproduced by the magnetic heads LP-K1 and LP-K2 have at least a minimum amplitude, the color television signals reproduced by the magnetic heads LP-K1 and LP-K2 can be transferred to the output 53 of the SP/LP head switching stage 49.

For this purpose, the color television signals reproduced by the magnetic heads LP-K1 and LP-K2 and appearing on the terminal 47 of the LP head switching stage 42 can be applied to the input 140 of the envelope detector 60 via an envelope generating unit, not shown, for generating an envelope, for example a diode stage. During those envelope halfwaves of the reproduced color television signals which are positive with respect to the reference potential 145, the first capacitor 144 can be charged to a voltage value $U_H$ via the first diode 141, which is conductive in this case, which value corresponds to the positive peak value of the envelope of the reproduced color television signals. The voltage value $U_H$ can be stored in the first buffer stage 143. During those envelope halfwaves of the reproduced color television signals which are negative with respect to the reference potential 145, the second capacitor 151 can be charged to a voltage value $U_L$ via the now conductive second diode 148, which value corresponds to the negative peak value of the envelope of the reproduced color television signals. The voltage value $U_L$ can be stored in the second buffer stage 150.

On its output 142, the first buffer stage 143 supplies the instantaneously stored voltage value $U_H$, and on its output 151, the second buffer stage 141 supplies the instantaneously stored voltage value $U_L$. By an appropriate choice of the resistance values of the resistors 153 and 156, it is possible to select a threshold value $U_S$ between the voltage value $U_H$ and the voltage value $U_L$, which threshold value $U_S$ can be applied to the inverting input 154 of the comparator 147.

The envelope of the reproduced color television signals, applied to the input 140 of the envelope detector 60 via the envelope generating unit, can be applied to the non-inverting input 146 of the comparator 147 via the now conductive first diode 141 during the envelope halfwaves which are positive with respect to the reference potential 145. At those instants at which the positive halfwave of the envelope of the reproduced color television signals corresponds to the threshold value $U_S$ the comparator, 147 produces edges forming the envelope information HI on its output 157. Thus, the envelope detector 60 can supply envelope information HI to the processing unit 56 of the control information generating unit 4 when the amplitude of the envelope of the color television signals reproduced by the magnetic heads LP-K1 and LP-K2 becomes smaller than or larger than a threshold value $U_S$ corresponding to a minimum amplitude.

The construction of the envelope detector 60 as a peak detector is particularly advantageous because the minimum amplitude of the envelope of the color television signals reproduced by means of the magnetic heads LP-K1 and LP-K2 can be chosen freely by selection of the resistance values of the resistors 153 and 156. Moreover, in the envelope detector 60 in the form of a peak detector, allowance has been made for the fact that in the color television signals reproduced by means of the magnetic heads LP-K1 and LP-K2, the crosstalk from adjacent track portions 27 is smaller than in the color television signals reproduced by means of the magnetic heads SP-K1 and SP-K2, for which reason the color television signals reproduced by means of the magnetic heads LP-K1 and LP-K2 can always be transferred to the output of the SP/LP head switching stage 49 when at least the minimum amplitude of the envelope of the color television signals reproduced by means of the magnetic heads LP-K1 and LP-K2, which minimum amplitude corresponds to the selected threshold value $U_S$, is available.

Figure 6:
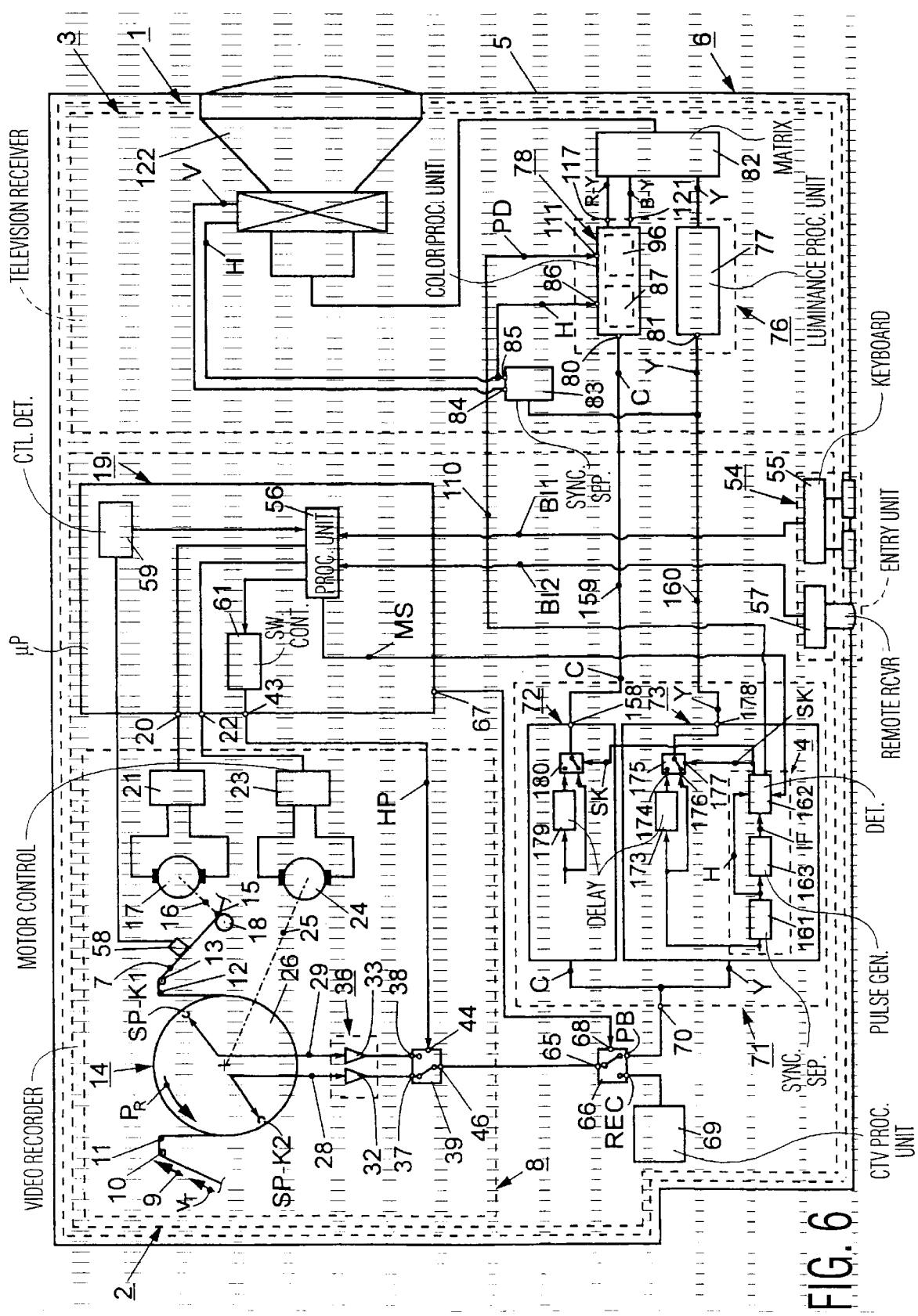
FIG. 6 shows a system in accordance with a fourth embodiment of the invention, in which the reproducing device is constituted by a magnetic tape video recorder device having two magnetic heads, and in which the control information generating unit is also incorporated in the magnetic tape video recorder device and comprises a phase jump detector.

FIG. 6 shows a system in accordance with a fourth embodiment of the invention, in which the reproducing device is constituted by a magnetic-tape video recorder device 2 having two magnetic heads SP-K1 and SP-K2. The color television signals reproduced by means of the magnetic heads SP-K1 and SP-K2 are amplified by the head amplifier unit 36, which in the present case comprises only the two head amplifiers 32 and 33, and can be applied to the inputs 37 and 38 of the SP-head switching stage 39. In a reproducing mode, the color television signals appearing on the output 46 of the SP head switching stage 39 can be supplied to the color signal processing unit 72 and the luminance processing unit 73 of the reproduction color-television-signal-processing unit 71 via the recording/reproduction switch 66. In a recording mode, the color television signals to be recorded can be applied, in a manner known per se, from the recording color-television-signal-processing unit 69 to the magnetic heads SP-K1 and SP-K2 via the recording/reproduction switch 66.

The color television signals processed in the color signal processing unit 72 of the reproduction color-television-signal-processing unit 71 can be applied from an output 158 of the color signal processing unit 72 to the input 80 of the color signal processing unit 78 of the color television receiving device 3 via a first electrically conductive connection 159. Likewise, the luminance signals Y processed in the luminance signal processing unit 73 of the reproduction color-television-signal-processing unit 71 can be applied from an output 178 of the luminance signal processing unit 73 to the input 81 of the luminance signal processing unit 77 of the color television receiving device 3 via a second electrically conductive connection 160. Due to the direct application of the processed color signal C and the processed luminance signal Y from the reproduction color-television-signal-processing unit 71 of the magnetic-tape video recorder device 2 to the color-television-signal-processing unit 76 of the color television receiving device 3 in the system 1 as shown in FIG. 6, the adder stage 74 and the signal separation stage 79 provided in the system 1 as shown in FIG. 1 can be dispensed with. The direct application of the processed color signal C and the processed luminance signal Y via the two connections 159 and 160 is particularly advantageous in a system 1 accommodated in a combination apparatus 6. It is to be noted that the color-television-signal-processing unit 76 in the system 1 as shown in FIG. 6 is of the same construction as in the system as shown in FIG. 1 and that the color-television-signal-processing unit 78 used therein is of the same construction as the color signal processing unit 78 shown in FIG. 2; however, if desired, it can also be constructed as the color signal processing unit 123 shown in FIG. 3.

The luminance signal processing unit 73 of the reproduction color-television-signal-processing unit 71 includes a sync separator stage 161, which extracts the line pulses H from the luminance signals Y. During the reproduction of line signals 64 in the above-described third operational state, in which the magnetic tape 7 is scanned along a special track portion 63, the line pulses H, which recur after the fixed line period $T_H$ during normal reproduction of line signals 64 from a track portion H, appear non-recurrently before or after the line period $T_H$ upon the last occurrence of a line pulse H, i.e., shifted in time, at each transition from a track portion 27 to an adjacent track portion 27. This non-recurrent time-shifted occurrence of a line pulse H at the transition from one track portion 27 to an adjacent track portion 27, constitutes a discontinuity in the reproduced color television signal.

The line pulses H supplied by the sync separator stage 161 can be applied to a pulse generator 163. The pulse generator 163 periodically generates fixed pulses $I_F$ having a period equal to the line period $T_H$ and applies these fixed pulses $I_F$ to a phase-jump detector 162. The line pulses H supplied by the sync separator stage 161 can also be applied to the phase-jump detector 162. Moreover, a control signal MS (multi-speed control signal) can be applied from the processing unit 56 of the microcomputer 19 to the phase-jump detector 162 of the luminance signal processing unit 73, which control signal indicates that a special reproducing mode (multi-speed mode) has been activated in the magnetic-tape video recorder device 2.

In the third operational state, the phase-jump detector 162, the phase relationship $P_H$ between the fixed pulses $I_F$ and the line pulses H. As long as line signals 64 are reproduced from a single track portion 27 in the third operational state, a constant phase relationship $P_H$ is obtained. At a subsequent transition from a track portion 27 to an adjacent track portion 27, as occurs in the third operational state, a non-recurrent phase jump occurs in the phase relationship $P_H$ between the fixed pulses $I_F$ and the line pulses H as a result of the time-shifted occurrence of a line pulse H, which constitutes a discontinuity in the reproduced color television signal, which can be detected by means of the phase-jump detector 162. When such a discontinuity in the reproduced color television signal is detected and from the presence of a control signal MS, the phase-jump detector 162 learns that a special reproducing mode has been activated, the phase-jump detector 162 can generate control information in the form of phase information PD. The phase-jump detector 162, however, only generates phase information PD upon every second discontinuity detected by the phase-jump detector 162, which will be discussed in more detail hereinafter. Thus, by means of the phase-jump detector 162, it is possible to determine the offset of the line signals 64 of a track portion 27 with respect to the line signals 64 of an adjacent track portion 27 by detection of the aforementioned phase jump, and to derive control information in the form of phase information PD from the offset thus determined. The sync separator stage 161, the pulse generator 163 and the phase-jump detector 162, in the present case, form the control signal generating unit 4 of the system 1, which can generate the phase information PD as control information, which can be applied to the switching information generating unit 96 via the electrically conductive connection 110 and can be processed in this unit.

The luminance signal processing unit 73 of the reproduction color-television-signal-processing unit 71 further includes a ½ H delay stage 173, which delays the luminance signal Y of the reproduced color television signals by half a line period $T_H$. The luminance signal Y which has been delayed in the ½ H delay stage 173 can be applied to a first input 174 of a delay switch 175. The non-delayed luminance signal Y of the reproduced color television signal can be applied to a second input 176 of the delay switch 175. Upon each discontinuity detected by the phase-jump detector 162, the phase-jump detector 162 can supply delay information SK to a control input 177 of the delay switch 175. The switching state of the delay switch 175 can be changed by means of the delay information SK. Depending on its switching state, the delay switch 175 can transfer either the delayed luminance signal Y applied to the first input 174 of the delay switch 175, or the non-delayed luminance signal applied to the second input 176 of the delay switch 175, to the output 178 of the luminance signal processing unit 73.

Likewise, color signal processing unit 72 of the reproduction color-television-signal-processing unit 71 includes a ½H delay stage 179 and a delay switch 180. Depending on the delay information SK applied to the delay switch 180 of the color signal processing unit 72 by the phase-jump detector 162 of the luminance signal processing unit 73, either the color signals C delayed by the delay switch 180 or the non-delayed color signals C can be transferred to the output 158 of the color signal processing unit 72.

When it scans the special track portion 63 shown in FIG. 9, the magnetic head SP-K1, which has the first azimuth angle AZI1, can reproduce only the color television signals recorded in the track portions $27_n$ and $27_{n-2}$. The color television signals recorded in the track portion $27_{n-1}$ have been recorded by means of a magnetic head having the second azimuth angle AZI2 and can, therefore, not be reproduced by means of the magnetic head SP-K1. The color television signals reproduced from the track portion $27_n$ by means of the magnetic head SP-K1 have been shifted in time by half a line period $T_H$ with respect to the color television signals reproduced from the track portion $27_{n-2}$. When the phase-jump detector 162 detects a discontinuity, which appears at the point of transition of the magnetic head SP-K1 from the track portion $27_n$ to the track portion $27_{n-2}$, and supplies delay information SK to the delay switches 175 and 180, the switching state of the delay switches 175 and 180, in a first case, is changed in such a manner that subsequently the non-delayed luminance signal Y is transferred to the output 178 of the luminance signal processing unit 73 and the non-delayed color signal C is transferred to the output 158 of the color signal processing unit 72. In this first case, the delay of the color television signal reproduced from the track portion $27_{n-2}$, which is dictated by the offset of the line signals 64 by half a line period $T_H$, is compensated for in that the delay switches 175 and 180 change over from the signals (luminance signal Y and color signal C) delayed by the ½H delay stages 173 and 179 to the non-delayed signals. Therefore, no color sequence errors arise in this first case, for which reason, the phase-jump detector 162 does not supply phase information PD in this first case.

In a second case, in which the phase-jump detector 162 supplies delay information SK upon detection of a discontinuity and the switching states of the delay switches 175 and 180 are changed in response to the delay information SK and subsequently supply a delayed luminance signal Y and a delayed color signal C, the delay by half a line period $T_H$, due the offset of the line signals 64, is added to the delay by the ½H delay stages 173 and 179, as a result of which the luminance signal Y appearing on the output 178 of the luminance signal processing unit 73 and the color signal C appearing on the output 158 of the color signal processing unit 72 are supplied with a delay by one line period $T_H$. In the second case, a color sequence error occurs as a result of the delay of the reproduced color television signals by one line period $T_H$ because two successive line signals the have the same configuration. In the second case, the phase-jump detector 162 supplies phase information PD to the input 111 of the color signal processing unit 78 via the electrically conductive connection 110, thereby enabling the correction of color sequence errors in the reproduced color signal C.

When the phase-jump detector 162 detects a discontinuity in the reproduced color television signal, it supplies delay information SK to the delay switches 175 and 180 upon each detection of a discontinuity, and it supplies phase information PD to the color signal processing unit 78 of the color television receiving device 3 upon each second detection of a discontinuity.

In this way, a system 1 in accordance with the invention is obtained by means of which color television signals, which have been recorded on the magnetic tape 7 as a long-play recording and which can be reproduced only by means of two magnetic heads SP-K1, SP-K2 in a special reproducing mode during reproduction in a magnetic-tape video recorder device 2, can be displayed by means of the picture display device 122 without any color errors, i.e., with the correct colors.

It is to be noted that the line pulses H, which can be supplied by the sync separator stage 161 of the luminance signal processing unit 73 and which can be applied to the phase-jump detector 162, can alternatively be applied to the phase-jump detector 162 from the output 85 of the sync separator stage 83 of the color television receiving device 3. In that case, the sync separator stage 161 of the luminance signal processing unit 73 can be dispensed with.

Figure 7:
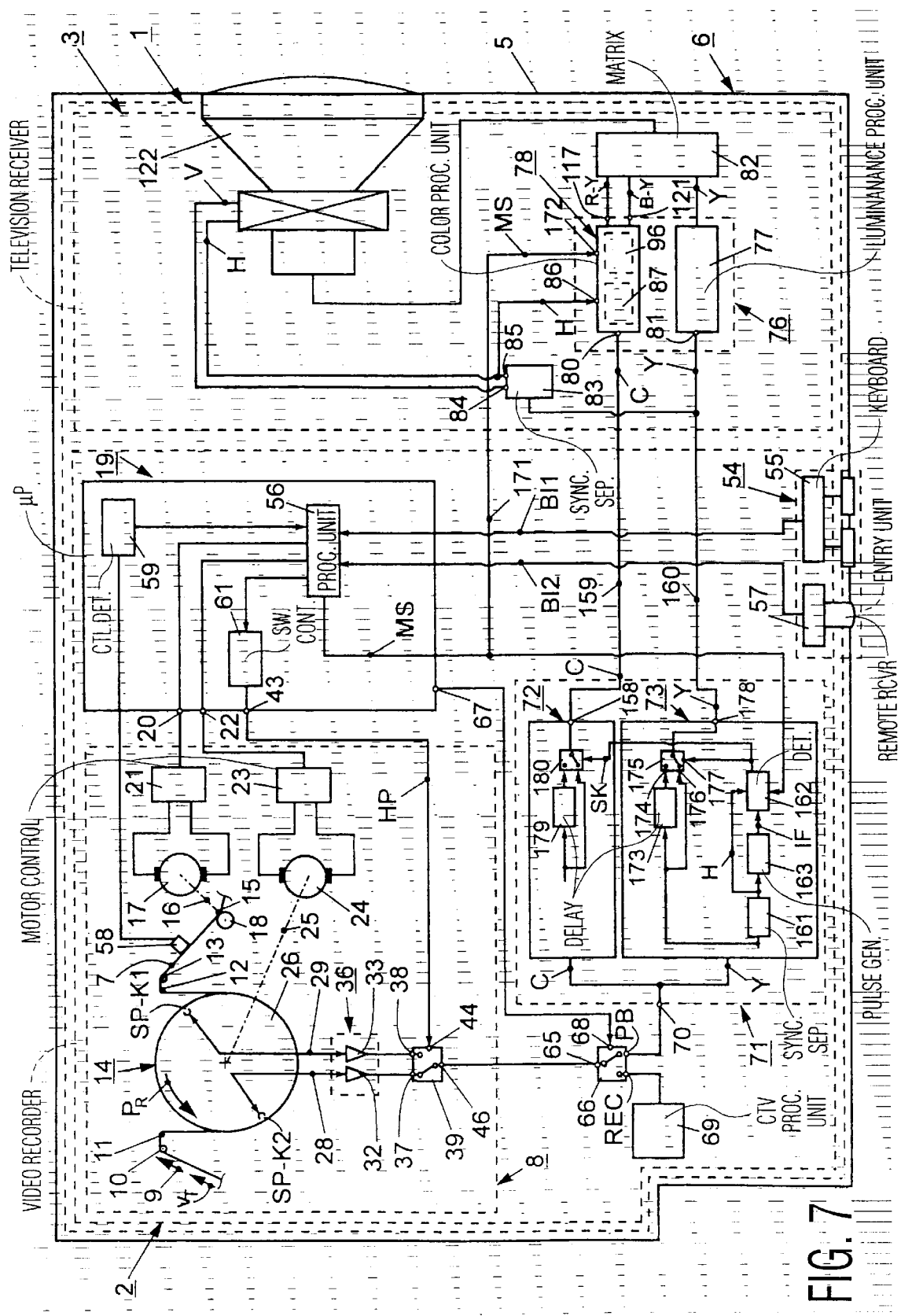
FIG. 7 shows a system in accordance with the invention a fifth embodiment of the invention, in which the reproducing device is constituted by a magnetic tape video recorder device having two magnetic heads and in which the control information generating unit is incorporated in the color television receiving device and comprises a phase detector.

FIG. 7 shows a system 1 in accordance with a fifth embodiment of the invention whose construction bears much resemblance to the system 1 as shown in FIG. 6 but in which system 1 of FIG. 7 the sync separator stage 161, the phase-jump detector 162 and the pulse generator 163 in the luminance signal processing unit 73 do not form a control information generating unit 4 as shown in FIG. 6, because these have been provided in the color television receiving device 3 in the system 1 of FIG. 7, which will be described in more detail hereinafter. Consequently, the phase-jump detector 162 cannot supply phase information PD to the color signal processing unit 78, for which reason no electrically conductive connection has been provided.

When a special reproducing mode has been activated in the system 1 as shown in FIG. 7, the processing unit 56 can generate a control signal MS (multi-speed signal), which can be applied to an input 172 of the color signal processing unit 78 of the color television receiving device 3 via an electrically conductive connection 171.

Figure 8:
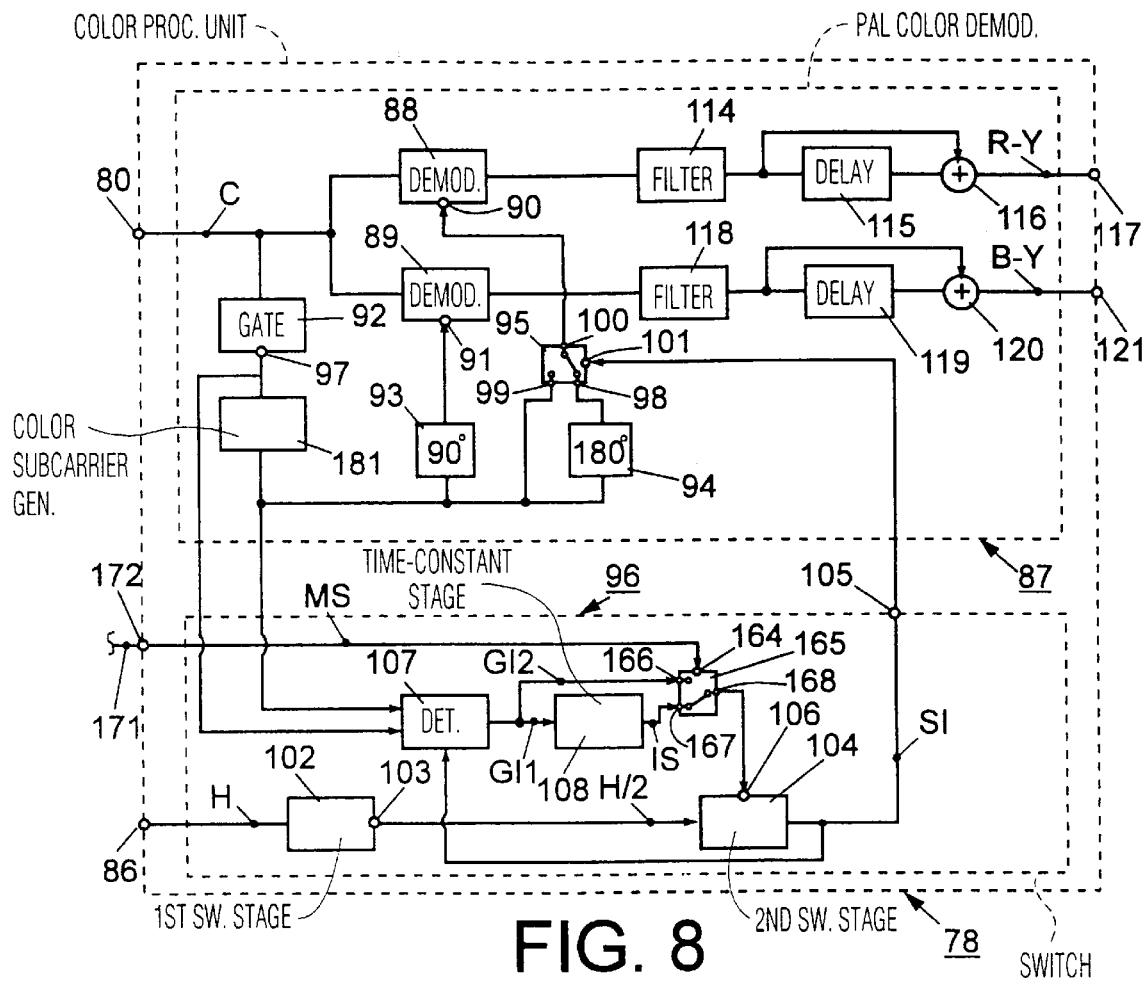
FIG. 8 shows a color signal processing unit of a color television receiving device of a system as shown in FIG. 7, in which a multi-speed control signal can be applied to the switching information generating unit.

The color signal processing unit 78 of the system of FIG. 7 is shown in detail in FIG. 8. The color signal processing unit 78 also takes the form of an integrated circuit and is adapted to demodulate color signals in accordance with the PAL color television system.

As is apparent from FIG. 8, the control signal MS supplied to the input 172 of the color signal processing unit 78 can be applied to the switching information generating unit 96, i.e., to a control input 164 of a switch 165, which has been provided additionally in the switching information generating unit 96 of the present system.

In the switching information generating unit 96 of the color signal processing unit 78 as shown in FIG. 8, the detector 107 again takes the form of a phase detector. The reproduced color subcarrier appearing on the output 97 of the color subcarrier gate 92 can be applied to the detector 107. Furthermore, the continuous wave from the color subcarrier generator 181 can be applied to the detector 107. Moreover, the detector 107 is arranged to receive switching information SI formed by a switching signal of half the line frequency supplied by the second switching stage 104. By comparison of the phase of the reproduced color subcarrier with the phase of the continuous wave, it is possible to derive phase information P which indicates whether the reproduced color subcarrier exhibits the first phase (−) or the second phase (+). The detector 107 can supply anti-phase information GI by evaluating the phase information P and the switching information SI. If, on the basis of the switching information SI, the detector 107 detects that the color subcarrier phase switch 95 is in such a position that the alternating-phase color subcarrier supplied by the color subcarrier phase switch 95 is not in phase with the reproduced color subcarrier, the detector 107 generates anti-phase information GI.

First anti-phase information GI1 is generated immediately after activation of a reproducing mode if the initial switching state of the color subcarrier phase switch 95 results in the reproduced color subcarrier and the alternating-phase color subcarrier being switched in phase opposition. Second anti-phase information GI2 is generated if a phase jump occurs at the transition from a track portion 27 to an adjacent track portion 27. The detector 107 can supply the anti-phase information GI1 and GI2 to the time-constant stage 108 and to a first input 166 of the switch 165. The time-constant stage 108 only supplies an initial signal IS to a second input 167 of the switch 165 after first anti-phase information GI1 has appeared a plurality of times.

When the normal reproducing mode is active, the initial signal IS received by the switch 165 can be applied to the input 106 of the second switching stage 104 by means of the switch 165 on the basis of the switching state of this switch 165 in order to change the phase of the switching information SI. When a special reproducing mode is active, the processing unit 56 supplies a control signal MS to the control input 164 of the switch 165 via the connection 171, as a result of which the switching state of the switch 165 is changed in such a manner that the first input 166 is connected to an output 168 of the switch 165, thereby enabling second anti-phase information GI2, received on the first input 166 of the switch 165, to be applied to the input of the second switching stage 104 via the switch 165 in order to change the phase of the switching information SI. Thus, when the normal reproducing mode is active, the initial signal IS, and when the special reproducing mode is active, the second anti-phase information GI2 can be applied from the output 168 of the switch 165 to the input 106 of the second switching stage 104 in order to change the phase of the switching information SI.

In the third operational state, in which the magnetic-tape video recorder device 2 is in a special reproducing mode and the processing unit 56 supplies a control signal MS to the control input 164 of the switch 165, the detector 107 detects a phase jump, which forms a discontinuity, in the phase of the color subcarrier of a reproduced color television signal at the transition of the reproduction from a track portion 27 to an adjacent track portion 27. Thus, in the system 1 as shown in FIGS. 7 and 8, the detector 107, which is adapted to detect an initial switching state, also forms the control information generating unit of this system, by means of which the second anti-phase information GI2 can be generated as the control information by which the correction of color sequence errors in a reproduced color signal can be initiated. The detector 107 supplies the second anti-phase information GI2 to the second switching stage 104 of the switching information generating unit 96 via the switch 165, as a result of which the phase of the switching signal of half the line frequency, supplied as switching information SI by the second switching stage 104, is changed by 180°. This switching information SI changes the switching state of the color subcarrier phase switch 95 and, consequently, the phase of the alternating-phase color subcarrier, as a result of which the demodulation of the R-Y signal component also proceeds correctly after the transition from a track portion 27 to the adjacent track portion 27.

The fifth embodiment of the invention described in the foregoing with reference to FIGS. 7 and 8, has the advantage of a particularly simple construction of the control information generating unit 4 because the detector 107 in the switching information generating unit 96 of the color signal processing unit 78 at the same time forms the control information generating unit and, as a consequence, substantially no separate means are needed to generate the control signal.

In order to increase the noise immunity of the switching information SI in the system of FIGS. 7 and 8, the second anti-phase information GI2 applied to the first input 166 of the switch 165 can also be applied to the first input 166 via a time-constant stage, the final anti-phase information being applied to the first input 166 of the switch 165 and thus to the second switching stage 104 after the second anti-phase information GI2 has occurred a few times. Thus, it can be precluded that a one-time error in the detection of a phase jump in the phase of the color subcarrier of a reproduced color television signal by means of the detector 107 results in the phase of the alternating-phase color subcarrier being changed by means of the color subcarrier phase switch 95.

It is to be noted that the reproducing device of a system in accordance with the invention can also be constituted by a video disc reproducing device adapted to reproduce color television signals from a video disc in which the adjacent track portions extend along a circular-arc or spiral path. Moreover, it is to be noted that a system in accordance with the invention need not be accommodated in a housing of a combination apparatus but the reproducing device and the color television receiving device may be accommodated in separate apparatuses interconnected by electrically conductive connections.

What is claimed is:

1. A system comprising:

a reproducing device for reproducing color television signals recorded on a record carrier, said reproducing device comprising a deck unit for driving a record carrier loadable into the reproducing device and for reproducing, by at least one reproducing head, the color television signals recorded in adjacent track portions on the record carrier; and an entry unit for activating at least one normal reproducing mode, in which the at least one reproducing head scans the record carrier along the adjacent track portions, and at least one special reproducing mode, in which the at least one reproducing head scans the record carrier across adjacent track portions;

a color television receiving device for displaying color television signals, said color television receiving device comprising a color-television-signal-processing unit, which includes a color signal demodulator for demodulating the color signal of the reproduced color television signals with the aid of switching information in order to preclude color sequence errors in a demodulated color signal, and a switching information generating unit for generating the switching information; and a control information generating unit for generating control information upon an occurrence of a discontinuity in a reproduced color television signal, said control information initiating a correction of color sequence errors in a reproduced color signal, characterized in that the control information generating unit of the system is connected to cooperate with the switching information generating unit of the color television receiving device, and in that the control information from the control information generating unit is processed in the switching information generating unit, the switching information generated by the switching information generating unit being influenced by the control information.

2. The system as claimed in claim 1, characterized in that the reproducing device is formed by a magnetic-tape video recorder device, the magnetic-tape video recorder device comprising two rotationally drivable magnetic heads as the at least one reproducing head for reproducing the color television signals from a magnetic tape loadable into the magnetic-tape video recorder device as the record carrier, said magnetic tape being drivable in a longitudinal direction, the color television signals being recorded on the magnetic tape in adjacent track portions which are inclined with respect to the longitudinal direction of the magnetic tape, each track portion carrying a given number of line signals of a color television signal and the line signals of adjacent track portions being recorded so as to be offset relative to one another in the longitudinal directions of the track portions, in that the control information generating unit is included in the magnetic-tape video recorder device and is connected to the switching information generating unit via an electrically conductive connection, and in that the control information generating unit includes a phase-jump detector for detecting a phase jump in a reproduced color television signal at a transition from one track portion to an adjacent track portion during reproduction in a special reproducing mode, and for generating the control information in dependence upon the detected phase jump.

3. The system as claimed in claim 2, characterized in that the phase-jump detector detects a phase jump in a train of horizontal synchronization pulses in a reproduced color television signal.

4. The system as claimed in claim 1, characterized in that the reproducing device is formed by a magnetic-tape video recorder device, the magnetic-tape video recorder device comprising four rotationally drivable magnetic heads as the at least one reproducing head for reproducing the color television signals from a magnetic tape loadable into the magnetic-tape video recorder device as the record carrier, said magnetic tape being drivable in a longitudinal direction, the color television signals being recorded on the magnetic tape in adjacent track portions inclined with respect to the longitudinal direction of the magnetic tape, each track portion carrying a given number of line signals of a color television signal and the line signals of adjacent track portions being recorded so as to be offset relative to one another in the longitudinal directions of the track portions, and each tine two of the four magnetic heads are arranged adjacent one another and form a head pair, the magnetic-tape video recorder device further including a head switching stage and a stage control unit for the head switching stage, said stage control unit supplying stage control information to the head switching stage, such that in a special reproducing mode, the reproduction is switched from one magnetic head of a head pair to the other magnetic head of the same head pair at a transition from one track portion to an adjacent track portion, and in that the control information generating unit is formed by the stage control unit for the head switching stage, the control information from the stage control unit being applied as control information to the switching information generating unit.

5. The system as claimed in claim 4, characterized in that the system further comprises an envelope detector for detecting an amplitude of an envelope of a color television signal reproduced by the four magnetic heads, and for generating detection information in dependence upon the detected amplitude of the envelope upon the occurrence of a discontinuity in a reproduced color television signal, said detection information being applied to the stage control unit forming the control information generating unit for influencing the stage control information supplied by the stage control unit.

6. The system as claimed in claim 1, characterized in that the switching information generating unit generates switching information in the form of a rectangular switching signal of half the line frequency, the switching information generating unit producing a 180° phase shift in the rectangular switching signal as additional switching information upon receipt of the control information.

7. The system as claimed in any one of the claims 1 to 6, characterized in that the color television signals reproduced from the record carrier by the reproducing device are in accordance with the PAL color television system, and the color signal demodulator is formed by a PAL color signal demodulator which includes a color subcarrier phase switch, the switching information generating unit having an output connected to a control input of the color subcarrier phase switch of the PAL color signal demodulator, the switching information from the switching information generating unit being applied to the control input of the color subcarrier phase switch for changing a switching state of the color subcarrier phase switch.

8. The system as claimed in claim 1, characterized in that the color television signals reproduced from record carrier by the reproducing device are in accordance with the SECAM color television system, and the color signal demodulator is formed by a SECAM color signal demodulator which includes two color signal delay switches, the switching information generating unit having an output connected to a control input of each of the color signal delay switches of the SECAM color signal demodulator, the switching information from the switching information generating unit being applied to each control input of the two color signal delay switches for changing switching states of the color signal delay switches.

9. The system as claimed in claim 1, characterized in that the color signal demodulator and the switching information generating unit are incorporated in an integrated circuit, the integrated circuit having a control information terminal for receiving the control information from the control information generating unit for application to the switching information generating unit.

10. The system as claimed in claim 1, characterized in that the reproducing device, the color television receiving device and the control information generating unit are arranged in a common housing and form parts of a combination apparatus.

* * * * *